(12) United States Patent  (10) Patent No.: US 7,414,621 B2
Yavid et al.  (45) Date of Patent: *Aug. 19, 2008

(54) METHOD AND APPARATUS FOR CONTROLLABLY PRODUCING A LASER DISPLAY

(75) Inventors: Dmitriy Yavid, Stony Brook, NY (US); Paul Dvorkis, E. Setauket, NY (US); Ron Goldman, Cold Spring Harbor, NY (US); Joseph Katz, Stony Brook, NY (US); Narayan Nambudiri, Kings Park, NY (US); Miklos Stern, Woodmere, NY (US); Chinh Tan, Setauket, NY (US); Carl Wittenberg, Water Mill, NY (US); Frederick F. Wood, Medford, NY (US)

(73) Assignee: Symbol Technologies, Inc., Hortsville, NY (US)

(*) Notice: Subject to any disclaimer, the term of this patent is extended or adjusted under 35 U.S.C. 154(b) by 613 days.

This patent is subject to a terminal disclaimer.

(21) Appl. No.: 10/980,142

(22) Filed: Oct. 31, 2004

(65) Prior Publication Data

US 2005/0140925 A1  Jun. 30, 2005

(51) Int. Cl.
  *G09G 5/00*  (2006.01)
(52) U.S. Cl. .................. 345/204; 345/81; 345/207; 345/208; 345/697
(58) Field of Classification Search ......... 345/204–215, 345/690–699, 76–84; 235/472.01
See application file for complete search history.

(56) References Cited

U.S. PATENT DOCUMENTS

| 6,935,566 | B1 * | 8/2005 | Mulla et al. ............ 235/472.01 |
| 7,124,952 | B2 * | 10/2006 | Tan et al. ............... 235/472.01 |
| 7,163,294 | B2 * | 1/2007 | Nambudiri et al. ............ 353/31 |

* cited by examiner

*Primary Examiner*—Vijay Shankar
(74) *Attorney, Agent, or Firm*—Kirschstein, et al.

(57) ABSTRACT

A laser projection device (LPD) suitable for displaying color images is disclosed. The LPD is used to excite various photoluminescent materials located on a display screen so as to produce multi-color displays. Additionally, the screen may be movably mounted so as to reduce laser speckling.

23 Claims, 19 Drawing Sheets

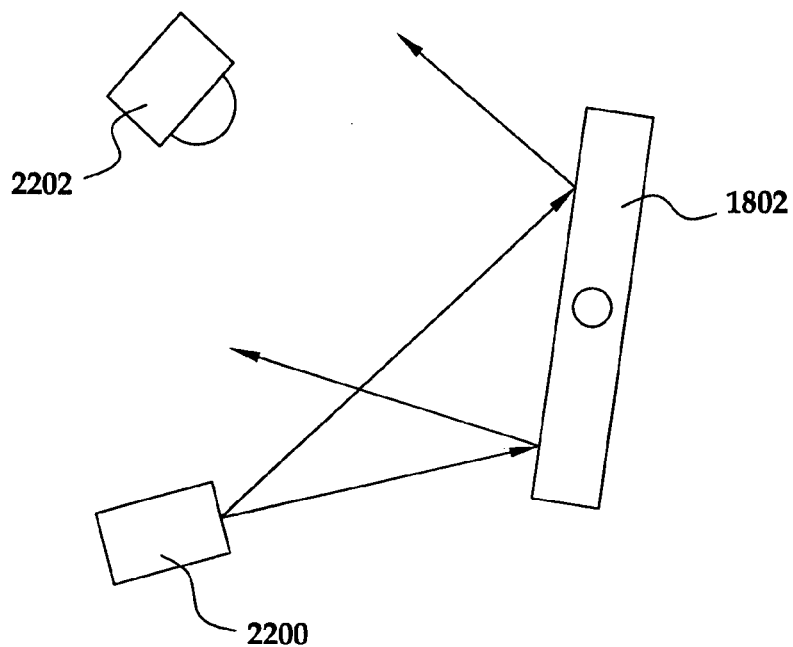
FIGURE 22
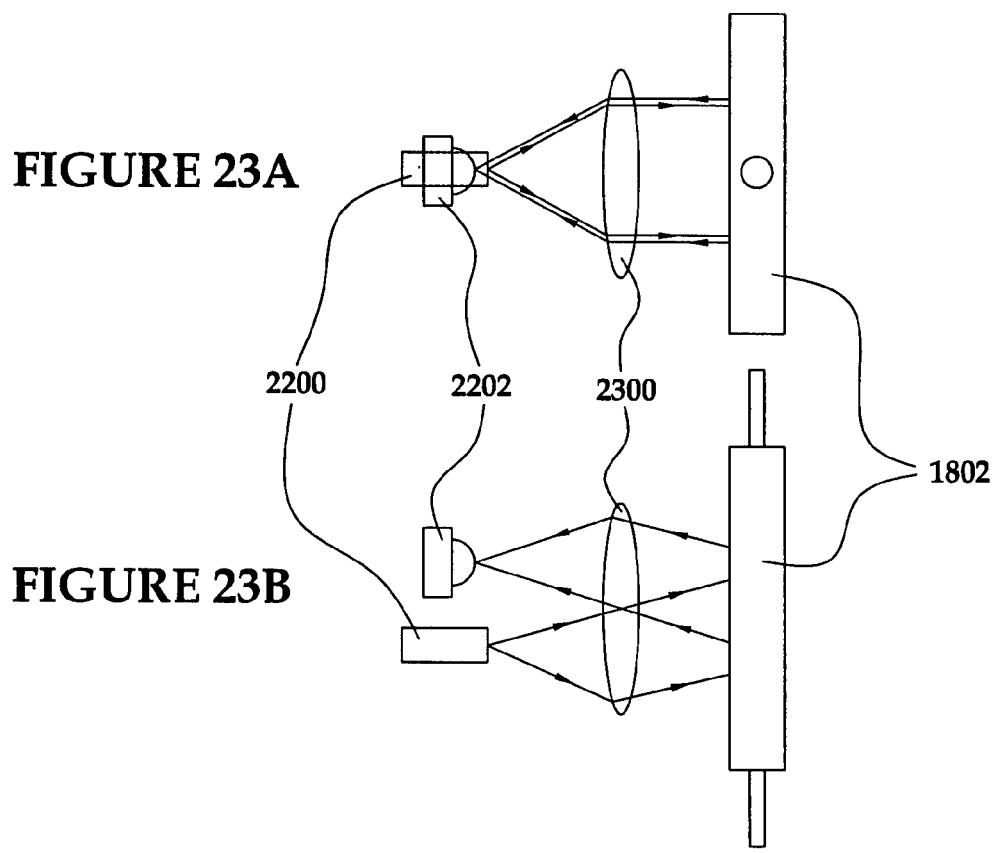
FIGURE 23A
FIGURE 23B

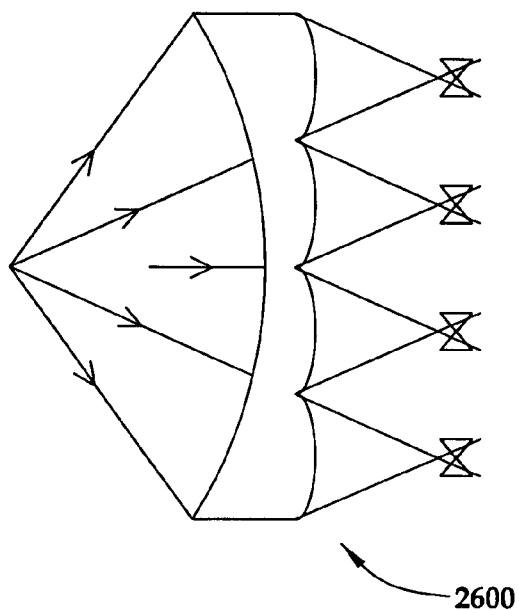
FIGURE 26
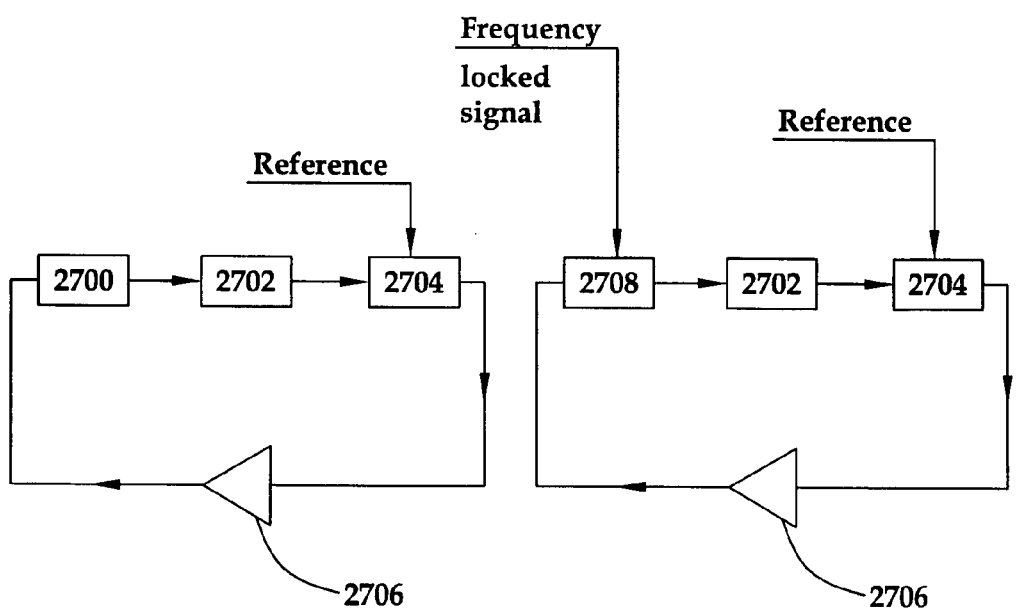
FIGURE 27A FIGURE 27B

METHOD AND APPARATUS FOR CONTROLLABLY PRODUCING A LASER DISPLAY

BACKGROUND OF THE INVENTION

1. Field of the Invention

This invention relates generally to electronic displays, and, more particularly, to a multi-color Laser Projection Display (LPD).

2. Description of the Related Art

Single-color or monochrome LPDs have been implemented using a raster-based scanning system. A raster-based LPD uses a laser and oscillating mirror(s) that move in horizontal and vertical directions to scan the laser light over a viewing screen in a raster pattern. By controllably modulating the laser in time with the movements of the mirror(s), a two-dimensional image can be produced. In fact, the LPD can produce a high quality image, such as VGA or higher resolution by modulating the mirrors at frequencies in the range of 10's and 100's of MHz.

Monochrome displays, however, have limited utility, whereas full color displays are in wide use and are desired and accepted by the general public. Full-color LPDs may be produced by controllably combining red, blue and green laser light to produce a wide spectrum of colors. Generally, red, blue and green lasers are commercially available, but not in small-form factors, such as semiconductor laser diodes, and modulating these lasers with image data has proven to be difficult.

The present invention is directed to overcoming, or at least reducing, the effects of one or more of the problems set forth above.

SUMMARY OF THE INVENTION

In one aspect of the instant invention, a method for displaying an image projected by a laser projection device is provided. The method comprises positioning laser light projected by said laser projection device in a first polarization orientation; passing at least a substantial portion of the laser light through a polarizer having an orientation substantially similar to the polarization orientation of the laser light projected by the laser projection device; and delivering the laser light passed through said polarizer to a screen.

In another aspect of the instant invention, an apparatus for displaying an image is provided. The apparatus comprises a laser projection device adapted to deliver a laser beam wherein the laser beam is polarized in a first preselected orientation, a polarizer adapted to receive the laser beam and pass a substantial portion of the laser beam therethrough, and a screen adapted to receive the portion of the laser beam passed through the polarizer.

In another aspect of the instant invention, a laser projection system for controllably reducing laser speckling is provided. The system comprises a frame, a screen flexibly coupled to the frame and an actuator. The actuator is coupled to the screen for inducing movement in said screen.

In still another aspect of the instant invention, a method for controllably reducing laser speckling is provided. The method comprises projecting laser light onto a screen, and controllably moving the screen.

In yet another aspect of the instant invention, an apparatus for displaying an image is provided. The apparatus comprises a laser projection device and a screen. The laser projection device is adapted to deliver a first laser beam of a first preselected frequency. The screen has a first photoluminescent material thereon adapted to emit light of a first preselected frequency in response to being illuminated by the laser beam, and a second photoluminescent material adapted to emit light of a second preselected frequency in response to being illuminated by the laser beam.

In another aspect of the instant invention, an apparatus for displaying an image is provided. The apparatus comprises a laser projection device and a screen. The laser projection device is adapted to deliver a first and second laser beam of a first and second preselected frequency, respectively. The screen has a first photoluminescent material thereon adapted to emit light of a first preselected frequency in response to being illuminated by the first laser beam, and a second photoluminescent material adapted to emit light of a second preselected frequency in response to being illuminated by the second laser beam.

BRIEF DESCRIPTION OF THE DRAWINGS

The invention may be understood by reference to the following description taken in conjunction with the accompanying drawings, in which like reference numerals identify like elements, and in which:

FIG. 22 stylistically shows one embodiment of a system for determining mirror position;

FIG. 23 stylistically shows one embodiment of a system for determining mirror position;

FIG. 26 stylistically illustrates one embodiment of a screen that may be employed with an LPD;

FIGS. 27A and 27B stylistically illustrate two embodiments of voltage controlled oscillators that may be employed in the instant invention;

Figure 1:
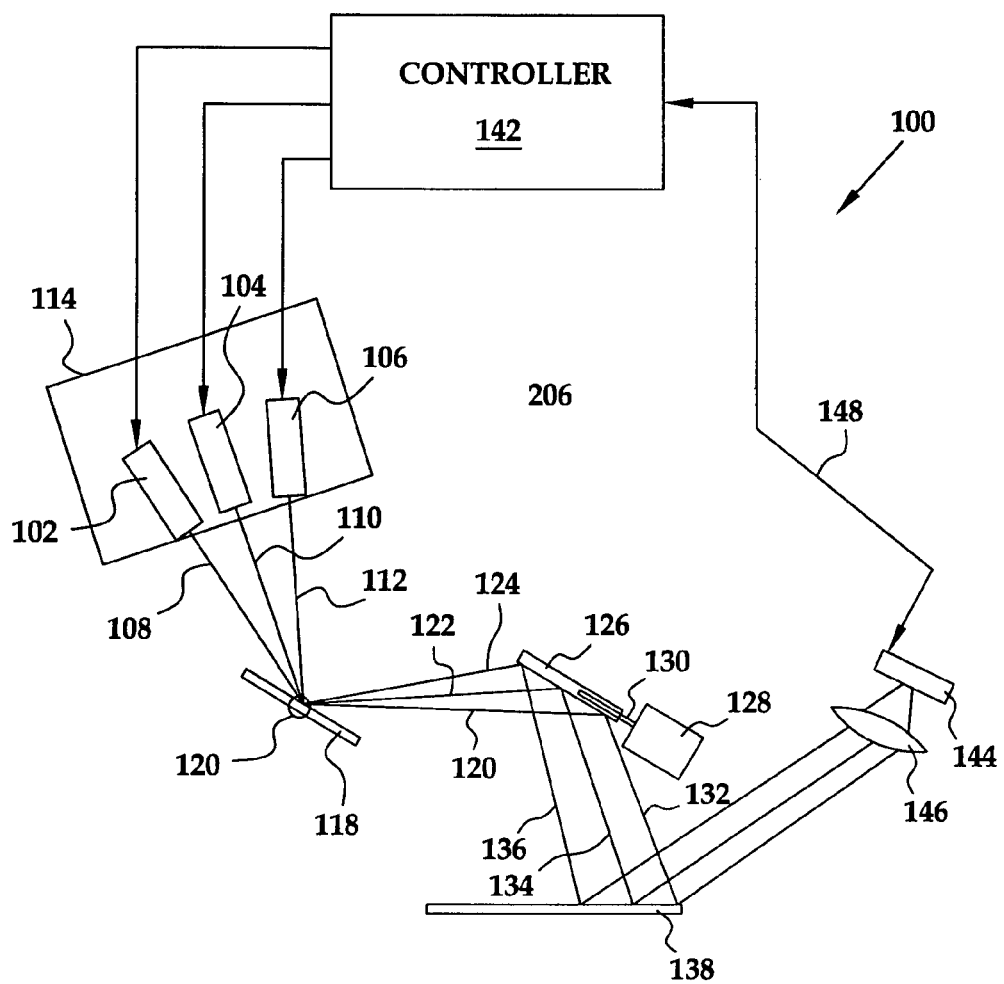
FIG. 1 is a stylistic block diagram of a top level view of one embodiment of a laser projection device (LPD) that may be employed in the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Turning now to the drawings, and specifically referring to FIG. 1, a stylistic block diagram of a laser projection display (LPD) 100, in accordance with one embodiment of the present invention, is shown. In the illustrated embodiment, the LPD 100 includes three lasers 102, 104, 106, each capable of emitting a beam of light 108, 110, 112 consisting of a unique color, such as red, green or blue. Those skilled in the art will appreciate that the number of lasers and the color of light emitted therefrom may be varied without departing from the spirit and scope of the instant invention.

The lasers 102, 104, 106 are arranged in a common plane 114 with the beams of light 108, 110, 112 being angularly directed relative to one another to fall on a substantially common location 116 on a first scanning device, such as a first scanning mirror 118, from where they are reflected as beams of light 120, 122, 124. In the illustrated embodiment, the first scanning mirror 118 oscillates on an axis 120 at a relatively high rate (e.g., about 20-30 KHz). Rotation or oscillation of the first scanning mirror 118 causes the beams of light 108, 110, 112 to be moved. That is, as the angular position of the fist scanning mirror 118 alters, so to does the angle of reflection of the beams of light 120, 122, 124 from the first scanning mirror 118. Thus, as the mirror oscillates the reflected beams of light 120, 122, 124 are scanned to produce movement of the beams of light 120, 122, 124 along one component of the two-dimensional display.

The second component of the two-dimensional display is produced by a second scanning device, such as a mirror 126. In the illustrated embodiment, the second mirror 126 is coupled to a motor 128 at a pivot point 130 so as to produce rotational or oscillating movement about an axis that is substantially orthogonal to the axis of rotation of the first mirror 118. The beams of light 120, 122, 124 are reflected off of the second mirror 126 as beams of light 132, 134, 136 and directed to a viewing surface 138. The viewing surface 138 may take on any of a variety of forms without departing from the spirit and scope of the instant invention. For example, the viewing surface 138 may be a fixed screen that may be front or back lit by the lasers 102, 104, 106 and may be contained in a housing (not shown) that is common with the LPD 100, or alternatively, the viewing surface 138 may take the form of any convenient, generally flat surface, such as a wall or screen, spaced from the LPD 100.

Figure 2:
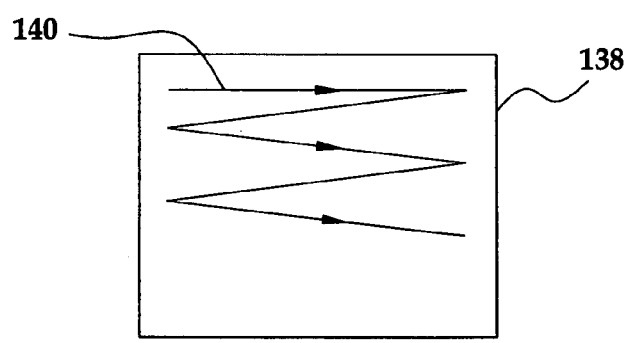
FIG. 2 is a stylistic view of a viewing surface shown in FIG. 1.

The second mirror 126 oscillates or rotates at a relatively slow rate, as compared to the rate of the first mirror 118 (e.g., about 60 Hz). Thus, it will be appreciated that, as shown in FIG. 2, the beams of light 132, 134, 136 generally follow a path 140 on the display surface 138. Those skilled in the art will appreciate that the path 140 is similar in shape and concept to a raster scan commonly employed in cathode ray tube televisions and computer monitors.

While the instant invention is described herein in the context of an embodiment that employs separate first and second scanning mirrors 118, 126, those skilled in the art will appreciate that a similar path 140 may be produced by using a single mirror. The single mirror would be capable of being moved about two axis of rotation to provide the fast and slow oscillating movements along two orthogonal axes.

As is apparent from FIG. 1, owing to the angular positioning of the lasers 102, 104, 106, even though the lasers 102, 104, 106 have been arranged mechanically and optically to deliver the beams of light 108, 110, 112 within the same plane 114 and at the same point (on the rotational axis 120) on the mirror 118), each has a different angle of reflection, which causes the beams of light 120, 122, 124 to diverge. A controller 142 is provided to controllably energize the lasers 102, 104, 106 to effectively cause the beams of light 120, 122, 124 to be collinear, such that they may be reflected off of the second mirror 126 and delivered to the same point on the viewing surface 138 relatively independent of the distance of the viewing surface 138 from the second mirror 126.

Figure 3A:
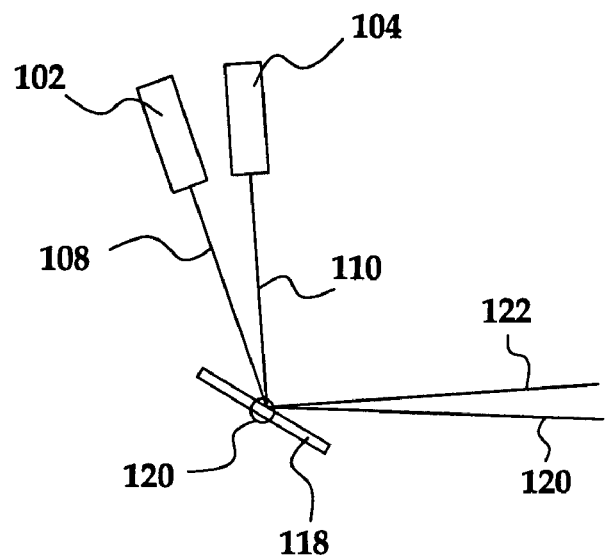
FIGS. 3A and 3B depict a top view of a scanning device at various times during its operation.
Figure 3B:
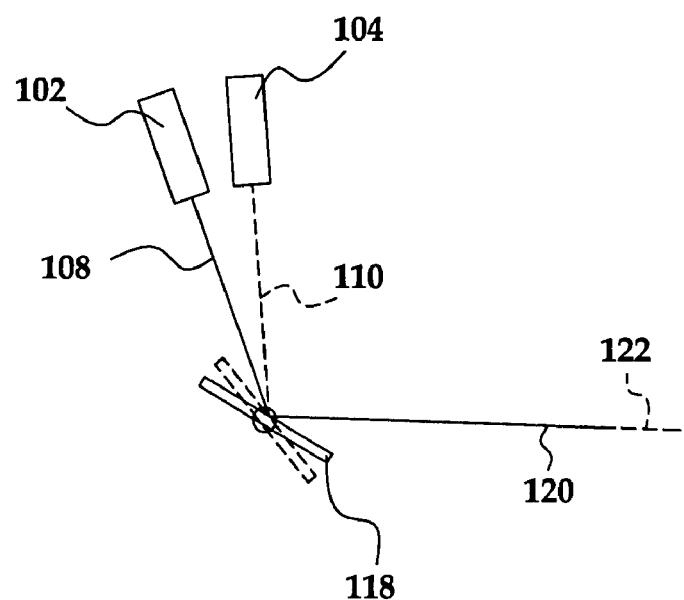

Turning now to FIGS. 3A and 3B, the operation of the controller 142 to cause the beams of light 120, 122, 124 to be collinear is discussed. To simplify the discussion, only two lasers 102, 104 are illustrated in FIG. 3, but those skilled in the art will appreciate that the concepts discussed herein may be extended to three or more lasers without departing from the spirit and scope of the instant invention. As shown in FIG. 3A, if the lasers 102, 104 are energized simultaneously, the reflected beams of light 120, 122 diverge. However, as shown in FIG. 3B, if the lasers 102, 104 are energized at slightly different times, then the beams of light 120, 122 can be made to follow a single, common path (i.e., the beams of light 120, 122 are collinear). For example, if the laser 102 is energized at a first time t1, then the mirror 118 will be at a first position, as represented by the solid lines, and the beam of light 108 will reflect off of the mirror 118 as the beam of light 120. Subsequently, if the laser 104 is energized at a second time t2, then the mirror 118 will be at a second position, as represented by the dashed lines, and the beam of light 110 will reflect off of the mirror 118 as the beam of light 122. By precisely controlling the time t2, the mirror 118 will be in a position to accurately reflect the beam of light 122 along substantially the same path as the beam of light 120.

Thus, through the operation of the controller 142, the beams of light 120, 122 are substantially collinear, but are slightly displaced in time. That is, the beams of light 120, 122 will now both be projected onto substantially the same point on the display surface 138, but at slightly different times. However, owing to the persistence of the human eye, the variation in timing is not detectable. That is, in the case of the three laser system described in FIG. 1, each of the lasers 102, 104, 106 will controllably deliver laser light of a unique color and intensity to substantially the same point on the viewing surface 138 within a relatively short window of time. The human eye will not detect the three separate colors, but rather will perceive a blending of the three light beams such that a consistent and desired hue appears at that point on the viewing surface. Those skilled in the art will appreciate that this process may be repeated numerous times along the path 140 to recreate a picture on the viewing surface 138.

Figure 4:
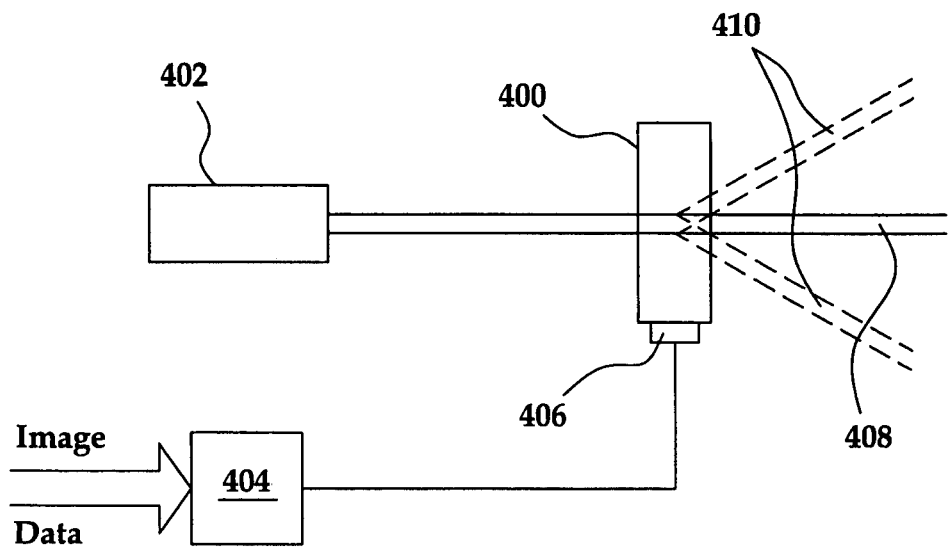
FIG. 4 is one embodiment of a circuit that may be used to control operation of a laser used in the system described in FIGS. 1-4.

As discussed above, the lasers 102, 104, 106 may be controlled to display an image. Controlling the lasers 102, 104, 106 involves controllably moving and modulating the laser light. Turning now to FIG. 4, one embodiment of a modulation scheme that may be employed in the instant invention is shown. An acousto-optic crystal 400 is positioned in front of a laser 402. A modulator 404 converts image data into RF signals, which drive a piezoactuator 406, coupled to the crystal 400. Acoustic waves, induced by the piezoactuator 406 propagate through the crystal 400, turning it into a grating, which, depending on the intensity of acoustic waves, diverts part of the optical energy from a main beam 408 into a plurality of side beams 410, thus modulating the beam 408 with image data.

Figure 5:
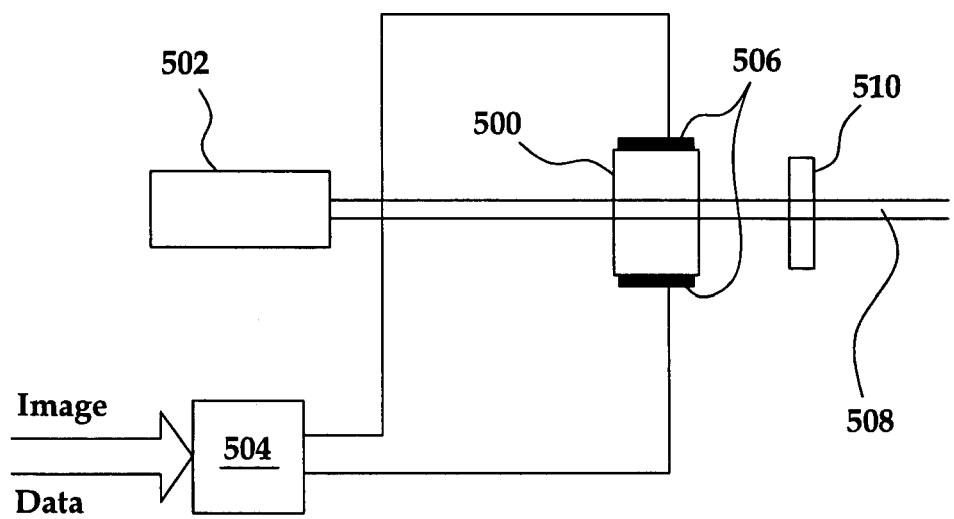
FIG. 5 is one embodiment of a circuit that may be used to control operation of a laser used in the system described in FIGS. 1-4.

The intensity of the laser light may also be controlled by the circuitry shown in FIG. 5. An electro-optic device 500, such as a Kerr cell or Pockels cell is positioned in front of a laser 502. The electro-optic device 500 possesses the property of rotating the polarization of the light passing through it. A modulator 504 converts image data into electric signals, which are applied to electrodes 506. The electrical signals applied to the electrodes 506 cause polarization of a laser beam 508 to rotate, depending on the magnitude of the voltage applied to the electrodes 506. Upon exiting the electro-optic device 500, the laser beam 508 is delivered to a polarizer 510. The direction of polarization of the polarizer 510 is selected to coincide with the direction of polarization of the laser 502. Thus, the amount of light passing through the polarizer 510 depends on how much the polarization of the beam 508 differs from its original direction, and hence intensity of the beam 508 is modulated by image data.

Figure 6:
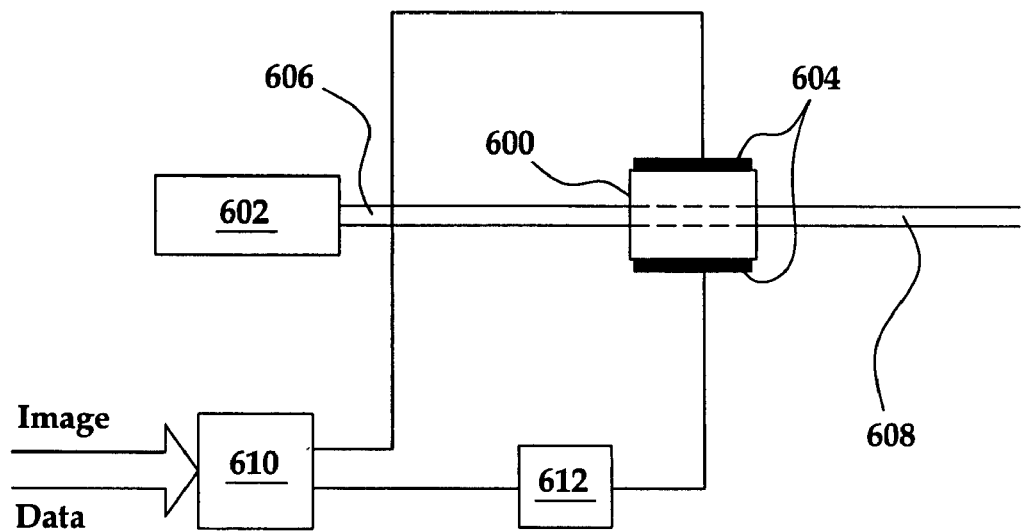
FIG. 6 is one embodiment of a circuit that may be used to control operation of a laser used in the system described in FIGS. 1-4.

Alternatively, modulation of the laser may be accomplished by the circuitry shown in FIG. 6. In one embodiment of the instant invention, IR light from a laser 600 may be converted into shorter wavelength light (for example, green or blue) by a frequency doubling crystal 602. Applying a voltage to the crystal 602 through electrodes 604 shifts phase-matching conditions inside the crystal 602 between the input IR beam 606 and an output visible beam 608, thus changing conversion efficiency and output power. A modulator 610 generates voltage according to image data. Additionally, a bias generator 612 may change a bias voltage on the crystal 602 to compensate for temperature change and preserve optimal phase matching conditions is the crystal 602.

Figure 7:
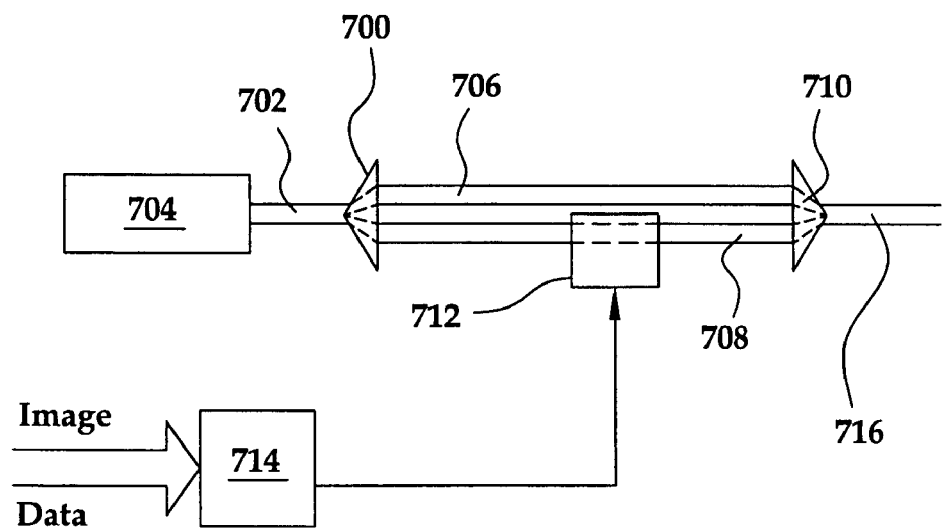
FIG. 7 is one embodiment of a circuit that may be used to control operation of a laser used in the system described in FIGS. 1-4.

FIG. 7 illustrates another embodiment of circuitry that may be employed to modulate the laser light. A beam splitter 700 splits a beam of light 702 from a laser 704 into two sub-beams 706, 708. While the beam 706 proceeds straight to a beam combiner 710, the beam 708 passes through an optical delay element 712 (e.g., micro-machined or electro-optical), which introduces a delay that is controlled by a modulator 714 according to image data. When the beams 706, 708 are recombined by the combiner 710, the intensity of an output beam 716 varies depending on phase relationship between the beams 706, 708. If they are in phase (i.e., zero delay applied to the beam 708) the intensity of the output beam 716 is the highest. If they are in opposite phase (ie., the beam 708 is delayed by a half-period) the output intensity is zero.

Figure 8:
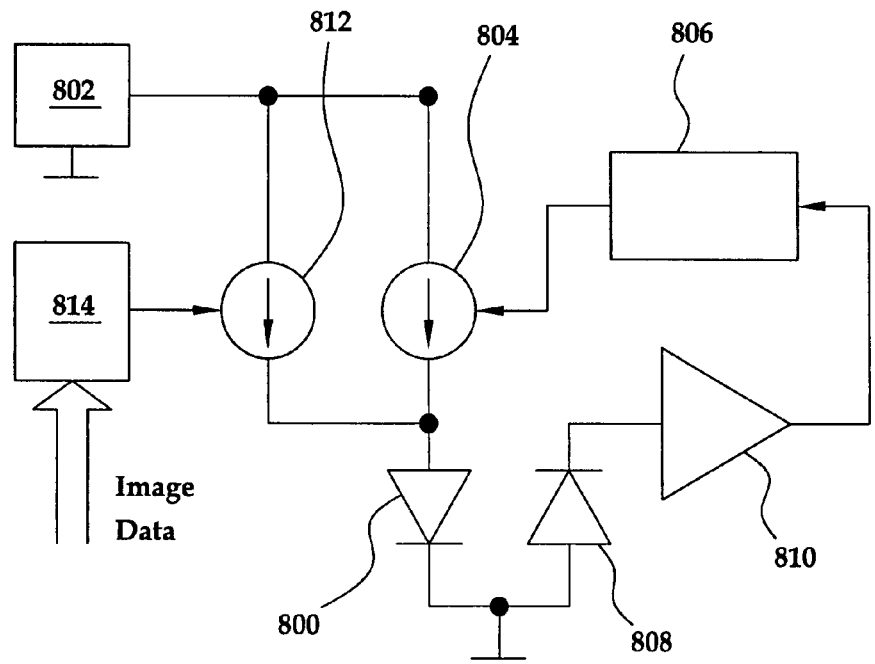
FIG. 8 is one embodiment of a circuit that may be used to control operation of a laser used in the system described in FIGS. 1-4.

Modulation of the laser light may also be provided by the circuitry set forth in FIG. 8. A laser 800 is supplied with constant bias current from power supply 802 through a first current source 804. The current source 804 is controlled by controller 806, which periodically compares the feedback signal from a laser photodiode 808, delivered through an amplifier 810 with a preselected level. A second current source 812 is controlled by a modulator 814 according to incoming image data, and its current is added to current from the first current source 804. The first current source 804 is adjusted in such way that when the current from the second current source 812 is substantially zero, the laser 800 is just above the radiation threshold. The second current source 812 is adjusted in such way that when Image Data requires maximum intensity, the laser 800, driven by combined current from sources 804, 812, radiates at full rated power. To achieve proper calibration, a dedicated part of the frame can be free from modulation.

Figure 9:
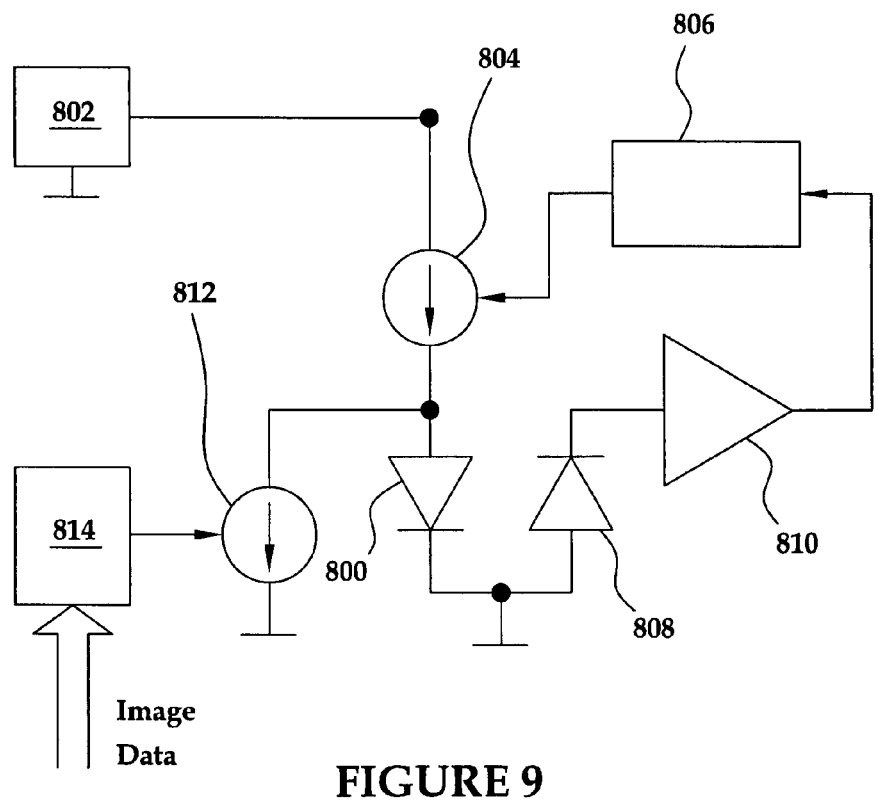
FIG. 9 is one embodiment of a circuit that may be used to control operation of a laser used in the system described in FIGS. 1-4.

Alternatively, as shown in FIG. 9, current from the second source 812 may be subtracted from, rather than added to, current from first source 804. In this case, the first current source 804 is adjusted in such way that the laser 800 radiates at full rated power when current from the second source 812 is zero. Current from the second source 812 is now inversely proportional to the image data value. Thus, when the image data calls for zero intensity, the current from second source 812 is the highest, and the laser 800 is just above the radiation threshold.

Figure 10:
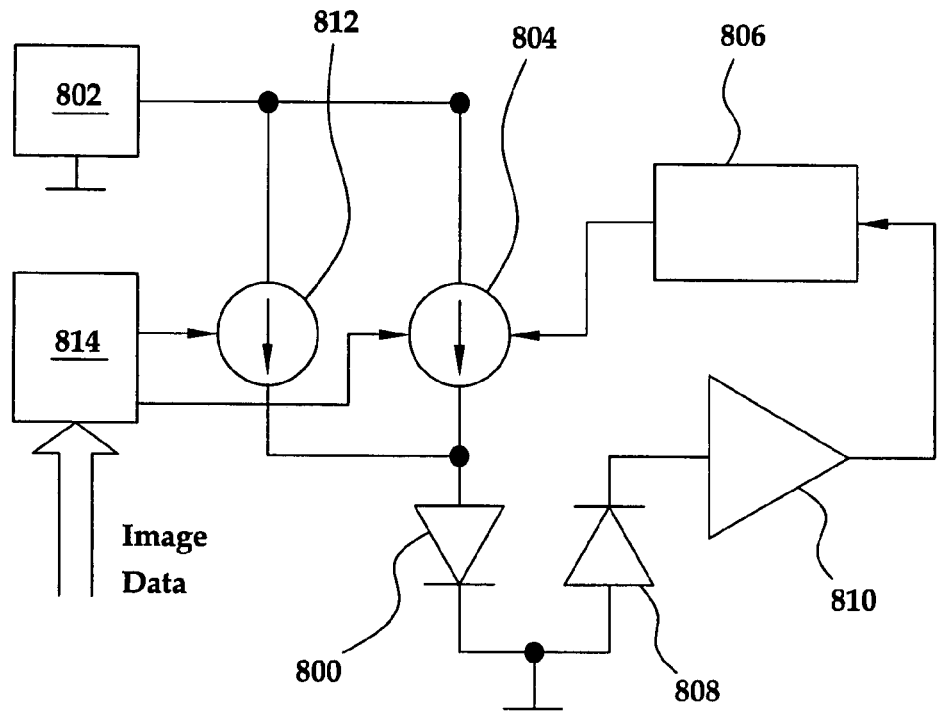
FIG. 10 is one embodiment of a circuit that may be used to control operation of a laser used in the system described in FIGS. 1-4.

Yet alternatively, the modulator 814 may be able to shut the first current source 804 completely off, when image data calls for zero intensity (FIG. 10). In this case, no bias current flows through the laser 800, so power can be conserved.

Figure 11:
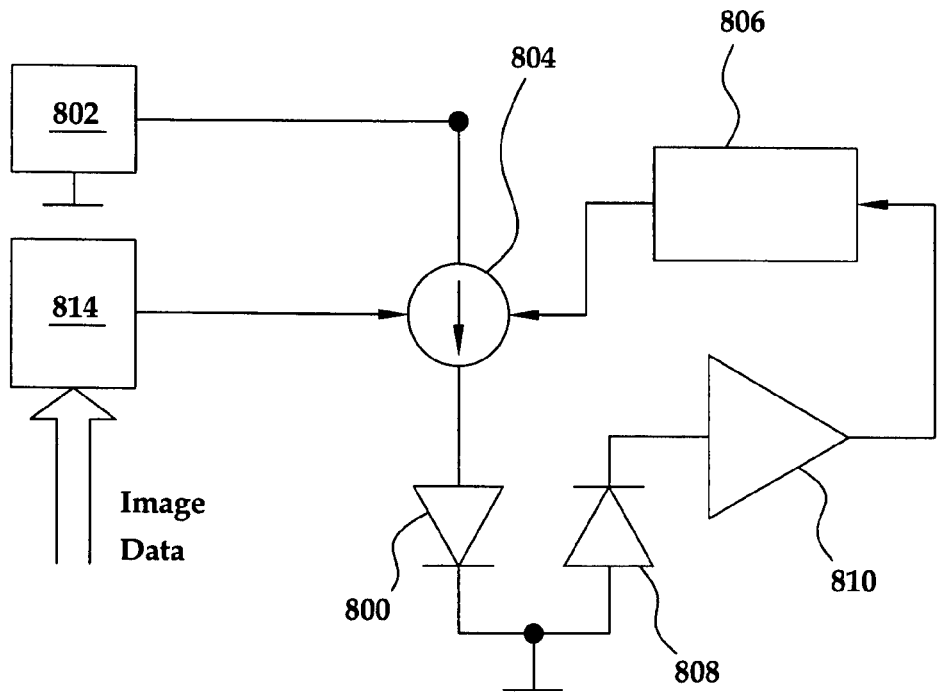
FIG. 11 is one embodiment of a circuit that may be used to control operation of a laser used in the system described in FIGS. 1-4.

Turning now to FIG. 11, yet another alternative is illustrated with the modulator 814 working in pulse-width modulation mode. A feedback loop consisting of the photodiode 808, amplifier 810 and controller 806 still adjusts the current of the source 804 in such way that the laser 80 radiates at full power when the current is enabled. The PDM modulator 814 switches the current on or off for a time proportional to image data.

Figure 12:
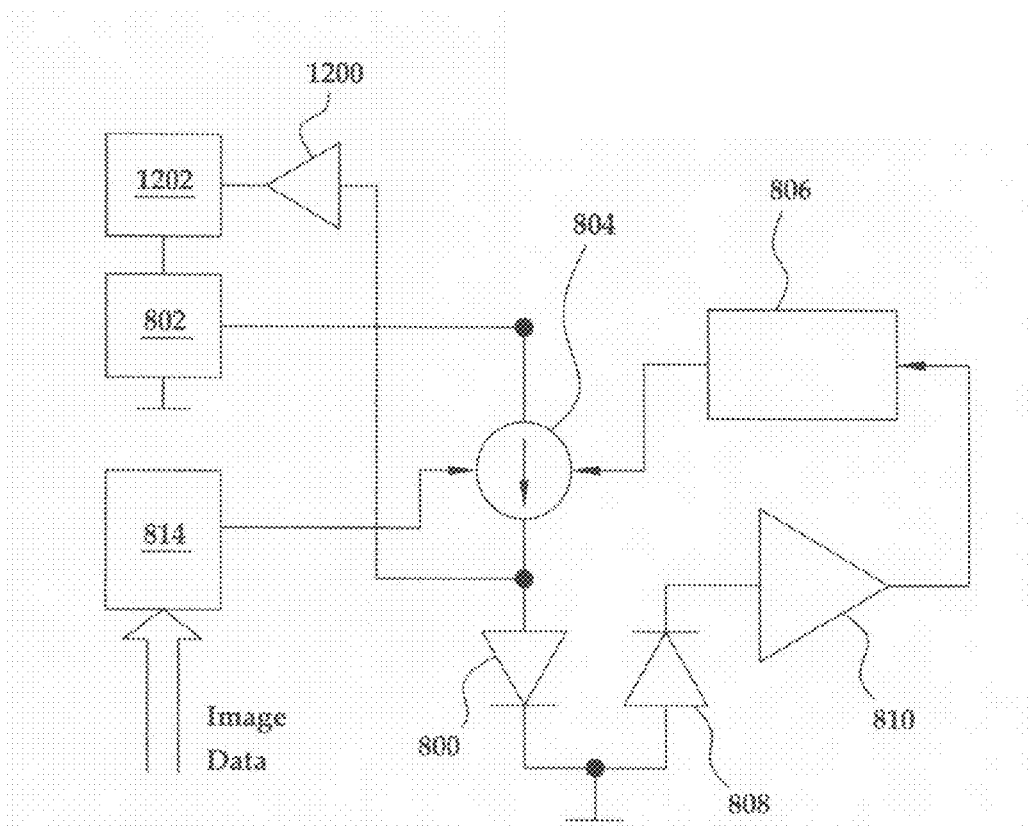
FIG. 12 is one embodiment of a circuit that may be used to control operation of a laser used in the system described in FIGS. 1-4.

In still another alternative embodiment shown in FIG. 12, the power efficiency of the laser modulation system can be improved if the power supply 802 is capable of delivering variable voltage and is controlled by an amplifier 1200 and controller 1202 in such way that the output voltage tracks changes of the dropout voltage on the laser 800.

Those skilled in the art will appreciate that the various circuits presented in FIGS. 8-12 can be readily modified to accommodate hot-case lasers instead of ground-case ones without departing from the spirit and scope of the instant invention.

Figure 13:
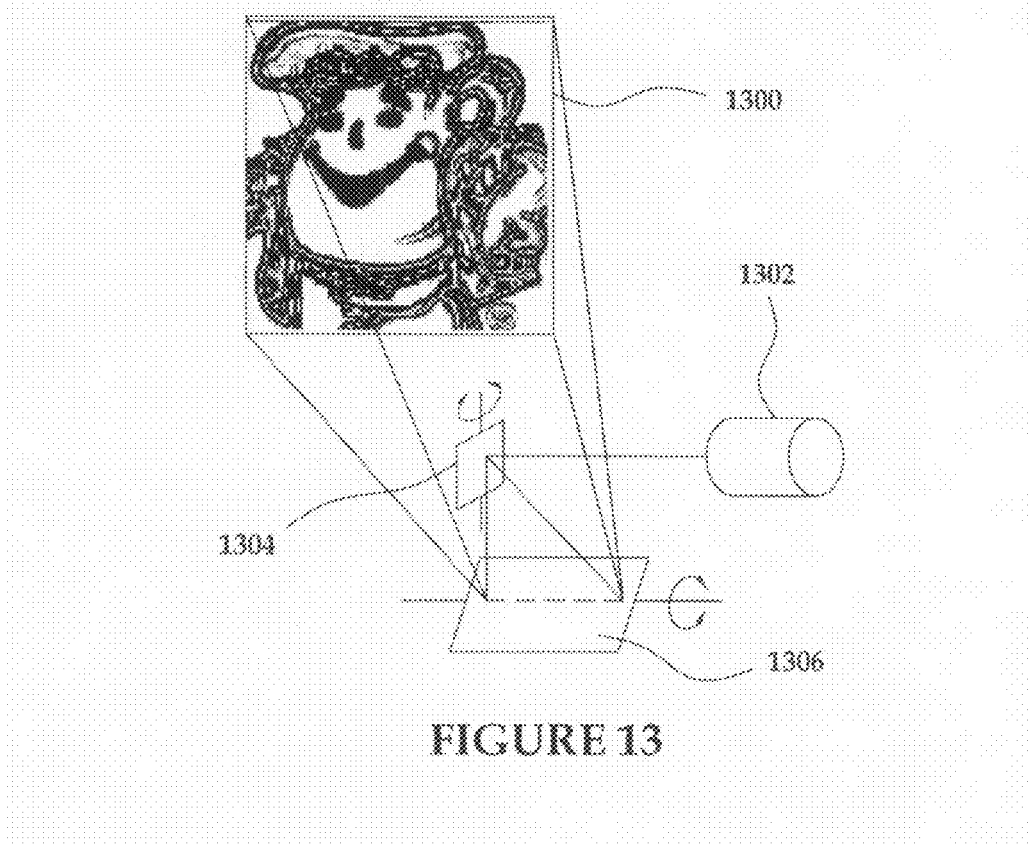
FIG. 13 stylistically shows one embodiment of a system capable of producing a multi-color display.

Turning now to FIG. 13, as discussed above, the system is arranged to display an image on a screen 1300 by a focused beam from the laser 1302 via two mirrors 1304, 1306. In one embodiment of the instant invention, the screen 1300 may take the form of a phosphor-coated screen 1300. In one embodiment of the instant invention, the screen 1300 can be coated with up-converting phosphor (a material that emits light of shorter wavelength than the incident light). In this case, the laser 1302 can take the form of an infrared laser. Alternatively, a blue or ultraviolet laser can be used with "normal," down-converting phosphor applied to the screen 1300.

Figure 14:
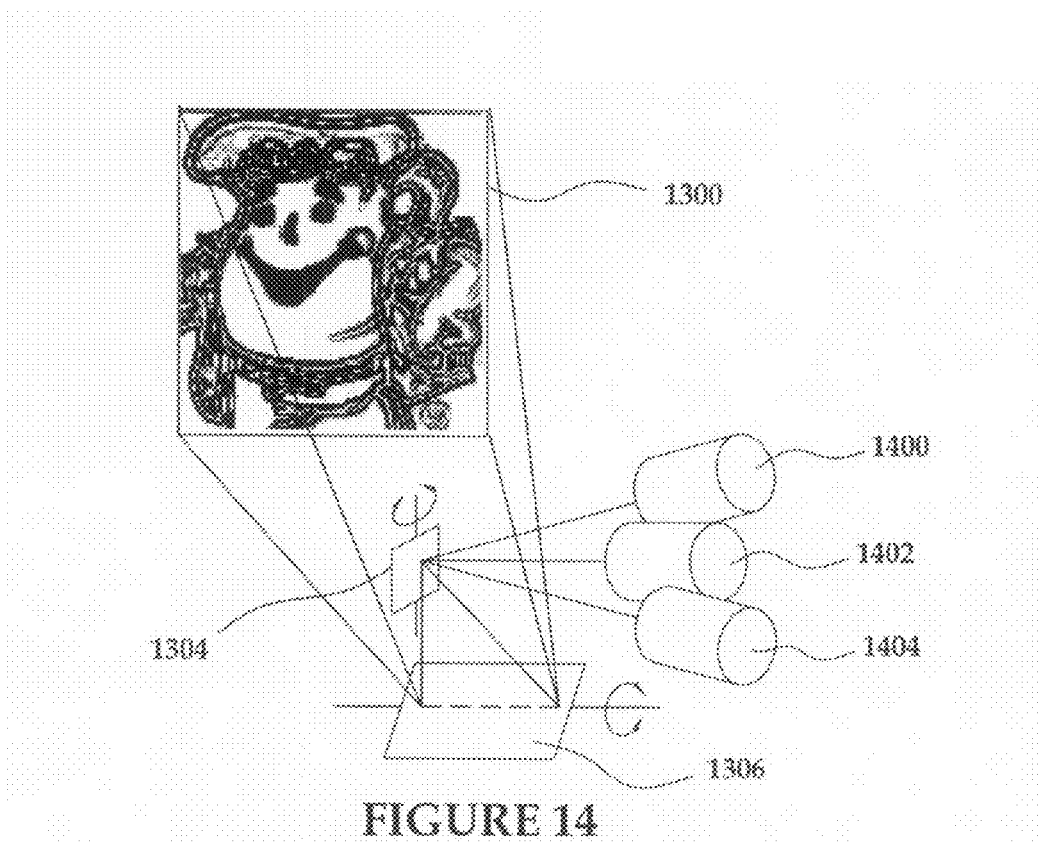
FIG. 14 stylistically shows one embodiment of a system capable of producing a multi-color display.

Full color image may be created by using a screen coated with a composition of three phosphors with emission wavelengths corresponding to three primary colors, and three lasers 1400, 1402, 1404, emitting in the absorption bands of those three lasers, so each laser paints the image corresponding to one primary color (FIG. 14). The phosphors can be either up-converting, or down-converting in any combination. Also, one or more colors can be painted by lasers directly. For example, the screen 1300 may be coated with a mixture of an up-converting phosphor with an absorption peak around 808 nm and an emission peak around 460 nm (blue), and a down-converting phosphor with absorption peak around 405 nm and emission peak around 550 nm (green). The red part of the image may be painted directly by a 635 nm visible laser, which is reflected from the screen without interaction with phosphors. The blue part is painted by an 808 nm IR laser, while the green part is painted by 405 nm violet laser.

Figure 15:
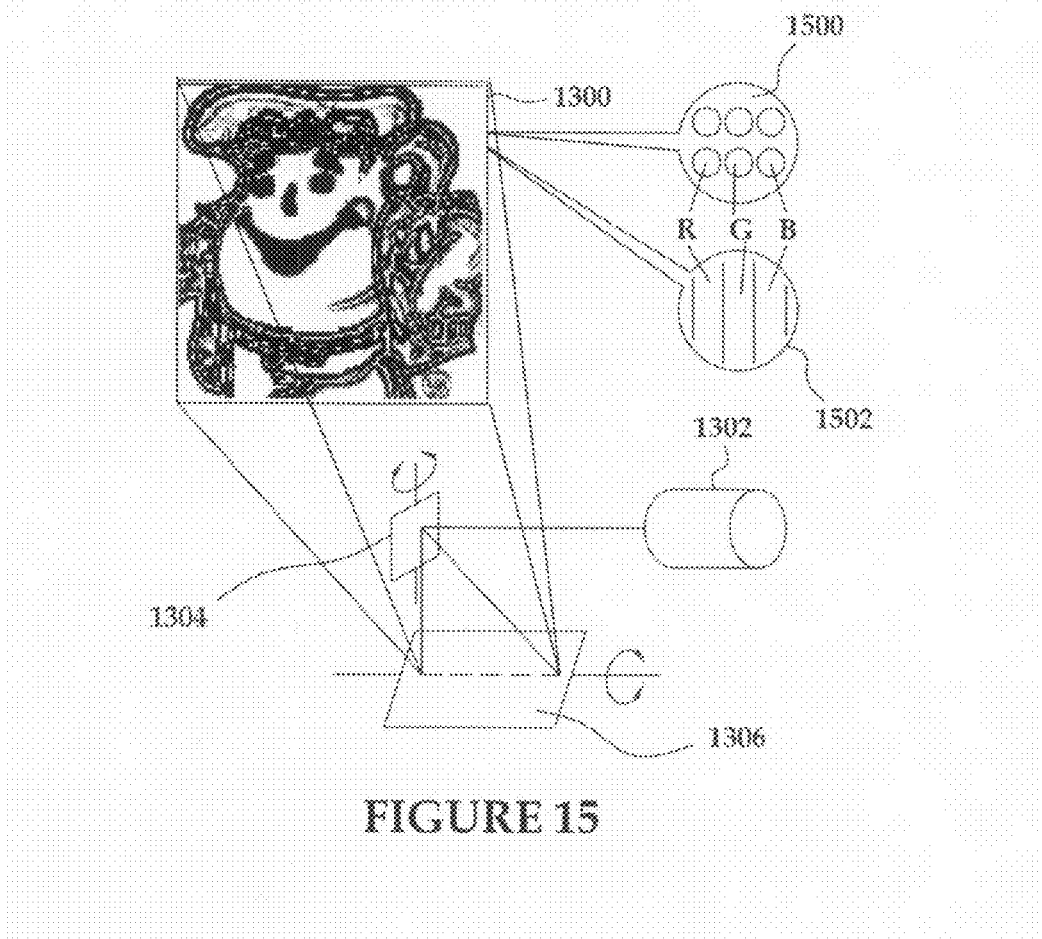
FIG. 15 is stylistically shows one embodiment of a system capable of producing a multi-color display.

Alternatively, as shown in FIG. 15, the screen 1300 may contain dots 1500 or lines 1502 of different phosphors with emission wavelengths corresponding to three primary colors, and close absorption wavelengths. Then all three phosphors can be excited by one laser emitting at their common absorption wavelength, while color components of the image will be rendered by modulating the laser intensity while it crosses respective color pixels or lines.

The laser beam can be scanned by an oscillating or rotating mirror, which may take a variety of forms, including polygonal. The laser beam can also be scanned by linearly moving a lens or an array of lenses with respect to the laser or by linearly moving a laser or an array of lasers with respect to the lens.

Figure 16A:
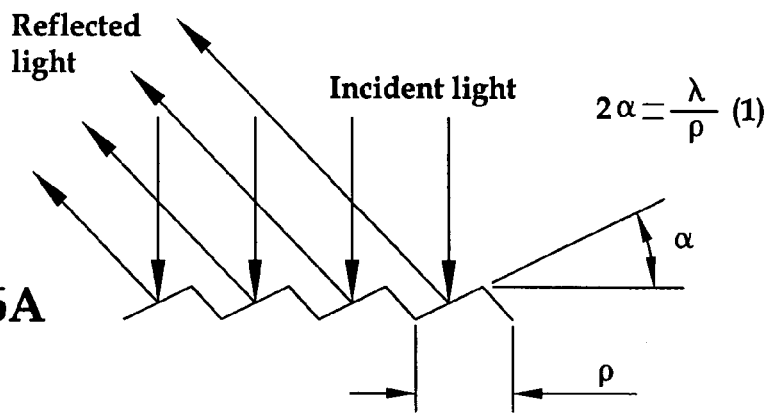
FIGS. 16A-C stylistically show embodiments of mirror structures that may be employed in the instant invention.
Figure 16B:
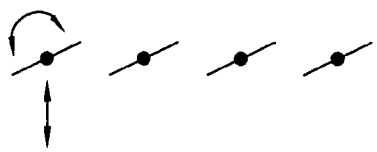

Blazed grating (FIG. 16A) acts as a substantially perfect mirror when the parameters of the grating satisfy Equation 1. Generally, that occurs when the phase delay of the light reflected from the edges of two adjacent lines of the grating is equal to a multiple of the wavelength. A substantially similar condition may be observed for any scan angle with an array of micro-mirrors that are turning and simultaneously moving up or down, while the array pitch is fixed (FIG. 16B).

Figure 16C:
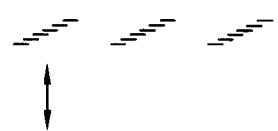

Alternatively, a substantially similar effect can be achieved with an array of smaller mirrors, that are moving up and down only (FIG. 16C), but who's size is comparable with the wavelength of visible light (akin GLV from Silicon Light Machine).

Inducing acoustic waves in certain crystals turns them into gratings with a period equal to the acoustic wavelength. Hence a laser beam may be scanned by passing the laser beam through such a crystal while changing the acoustic frequency.

Figure 18:
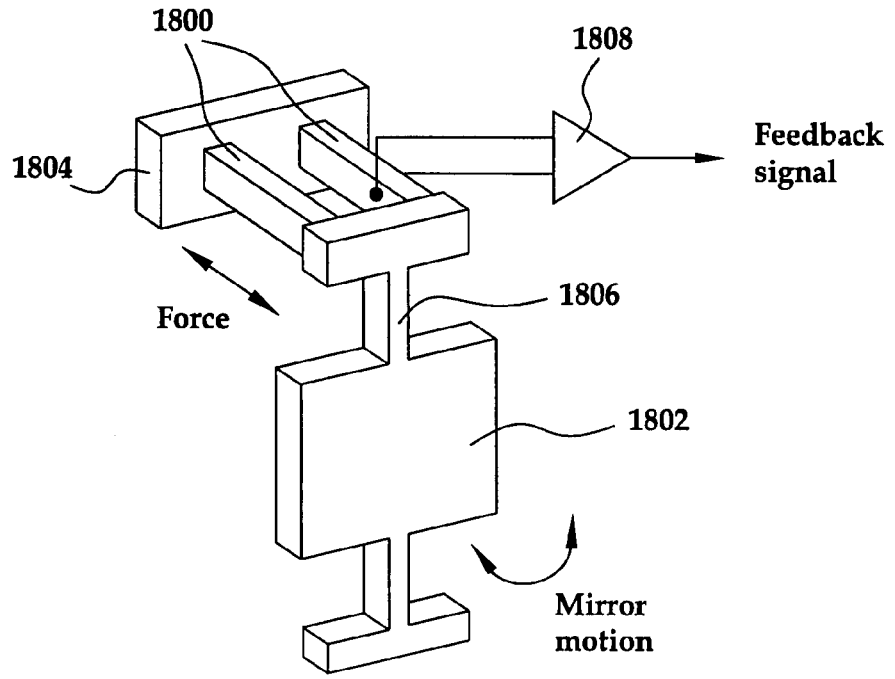
FIG. 18 stylistically shows one embodiment of a system for determining mirror position.

Information about absolute position of a scanning mirror can be extracted indirectly. For example, as shown in FIG. 18, piezo elements 1800 may be used to produce a force that scans a mirror 1802. By measuring a voltage generated by the piezo elements 1800, the amount of force produced and hence the angular movement of the mirror 1802 may be derived. In the illustrated embodiment, the piezo elements 1800 are mounted on a base 1804, which are subject to forces generated by a hinge 1806. Since the angular deflection of the mirror 1802 is generally proportional to the torque the hinge produces, the voltage from the piezo elements 1800 is also proportional to the deflection. Since the piezo elements 1800 are essentially capacitors, their impedance may be quite high, especially at low frequencies, a signal conditioner 1808 with high input impedance may be useful.

Figure 19:
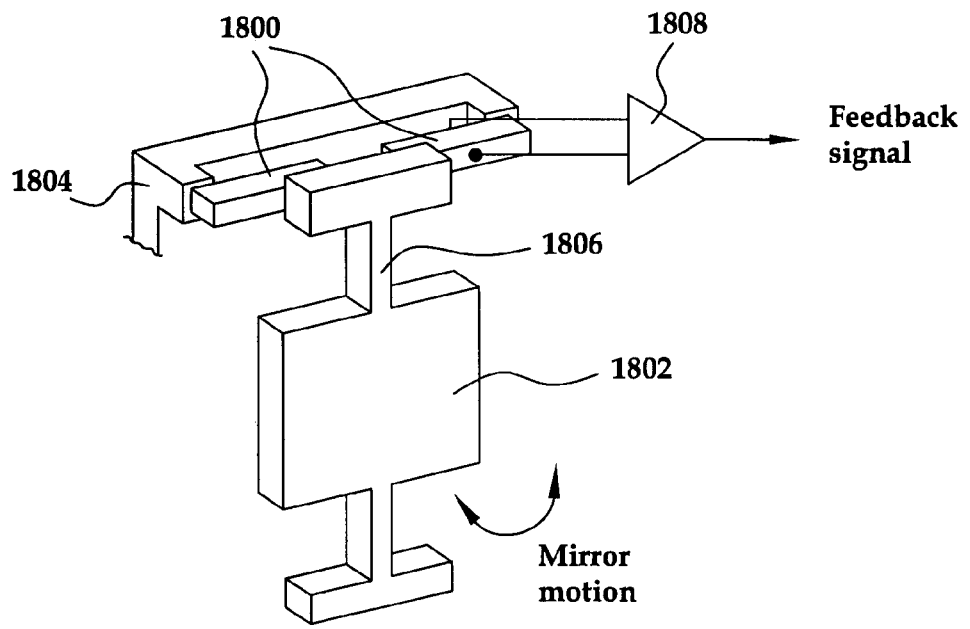
FIG. 19 stylistically shows one embodiment of a system for determining mirror position.

Those skilled in the art will appreciate that in an alternative embodiment of the instant invention, the piezo elements 1800 may be take the form of benders, as shown in FIG. 19.

Figure 20:
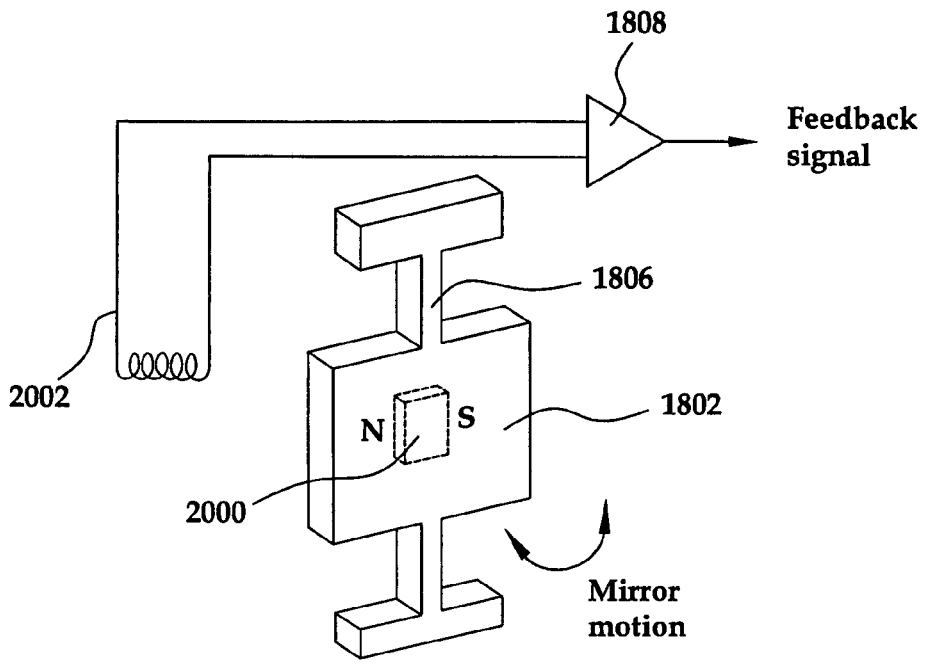
FIG. 20 stylistically shows one embodiment of a system for determining mirror position.

Position sensors may also be used to detect the position of the scanning mirror. As shown in FIG. 20, a relatively small magnet 2000 may be attached to the mirror 1802, and a stationary coil 2002 can be used to determine the angular velocity of the mirror 1802. That is, the voltage in the coil 2002 is proportional to the velocity for reasonably small scan angles. Since velocity is a derivative of mirror position, position can be determined by integrating the velocity feedback signal. Those skilled in the art will appreciate that the position and movement of the magnet 2000 and the coil 2002 may be reversed without departing from the spirit and scope of the instant invention. That is, the coil 2002 may be on the mirror 1802 while the permanent magnet 2000 is stationary.

Alternatively, a relatively small piece of soft magnetic material, magnetized by external permanent magnets can be used without departing from the spirit and scope of the instant invention.

Figure 21:
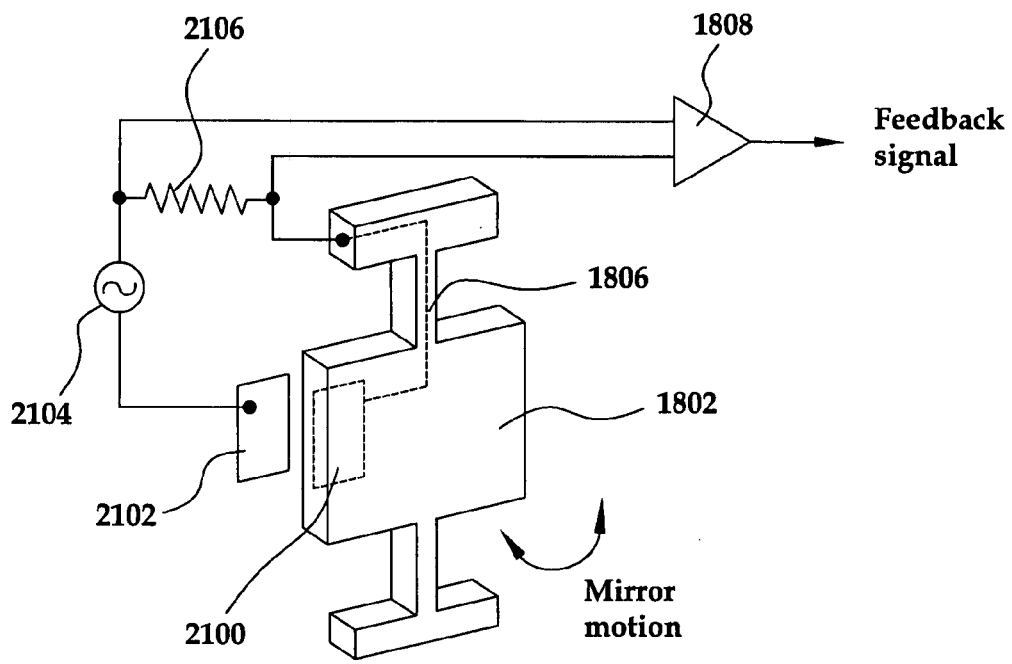
FIG. 21 stylistically shows one embodiment of a system for determining mirror position.

Turning now to FIG. 21, mirror position can also be determined by measuring the capacitance between an electrode 2100 disposed on the mirror 1802 and a stationary electrode 2102 spaced therefrom. Current from a current source 2104 may be applied and the resulting voltage dropout across a resistor 2106 may be measured as an indication of mirror position. Those skilled in the art will appreciate that if the mirror 1802 itself is conductive, the electrode 2100 may not be necessary.

As shown in FIG. 22, mirror position can also be determined by measuring the amount of light from a light source 2200, reflected by the mirror 1802 towards a photo detector 2202. A particularly advantageous optical arrangement is shown in the top and side views of FIGS. 23A and 23B, where FOVs of both the light source 2200 and the detector 2202 are collimated by a lens 2300. In this case, the detector 2202 sees a sharp light pulse when the mirror 1802 surface is substantially perpendicular to the direction of the collimated light beam coming from the lens 2300.

Figure 17:
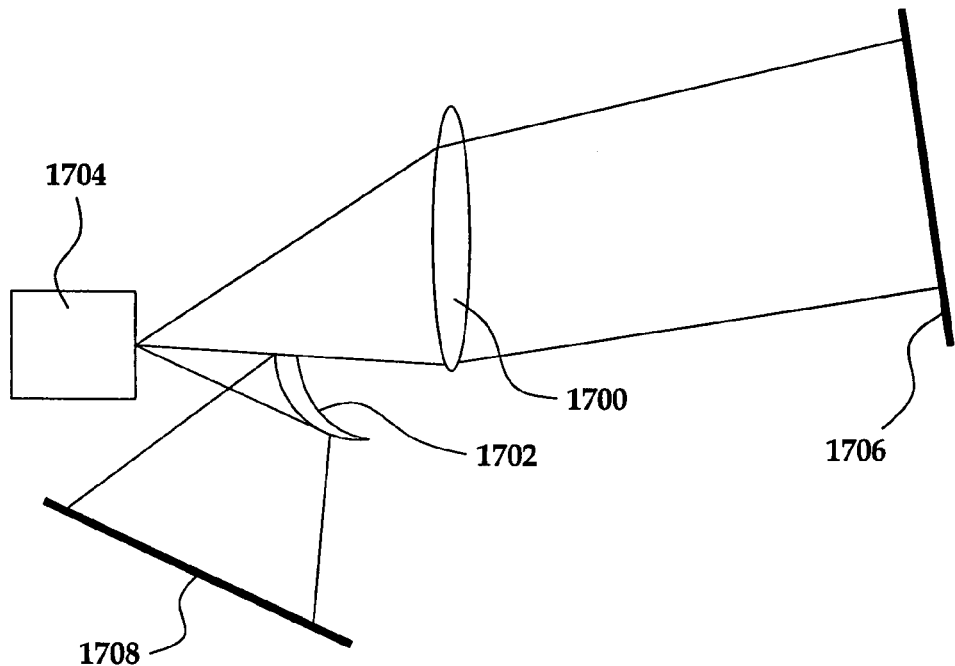
FIG. 17 stylistically shows a mirror and lens arrangement that provides two displays from a single LPD.

A variety of lenses 1700 or mirrors 1702, having different tilt angles and optical powers, can be positioned in the FOV of an LPD projector 1704, thus creating multiple images of various size and resolution. For example, a small, hi-res image 1706 far away, and a large, low-res image 1708 close by (FIG. 17) may be produced. The LPD controller has to be aware about positions of optical elements and process image data intended for each image accordingly.

Figure 24:
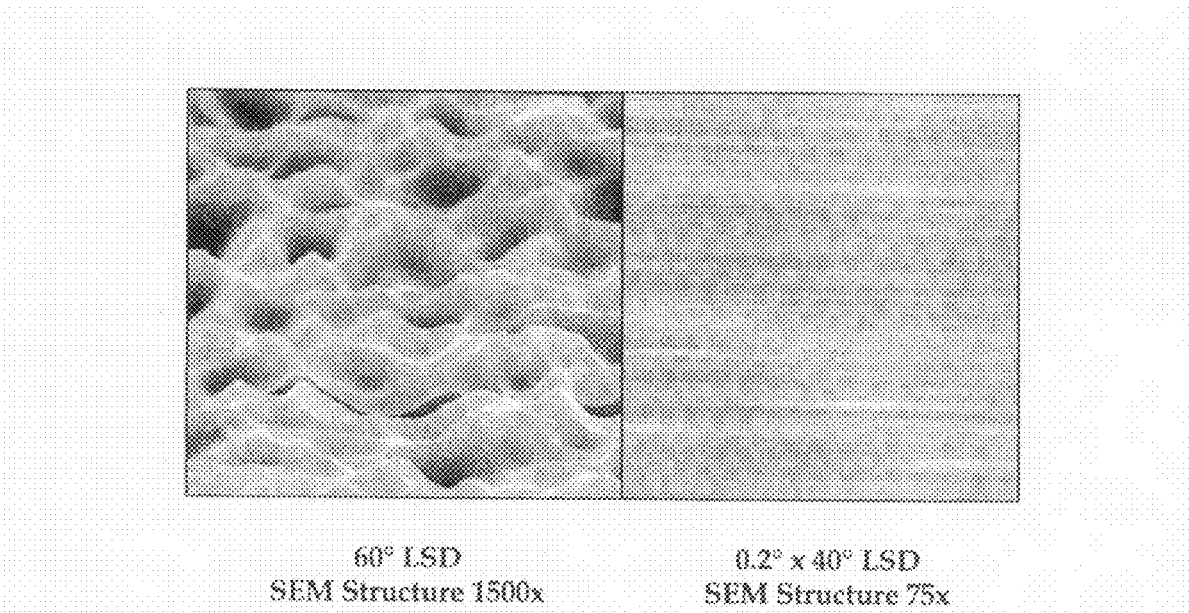
FIG. 24 is a magnified view of two types of viewing screens that may be employed with an LPD.
Figures 25A, 25B:
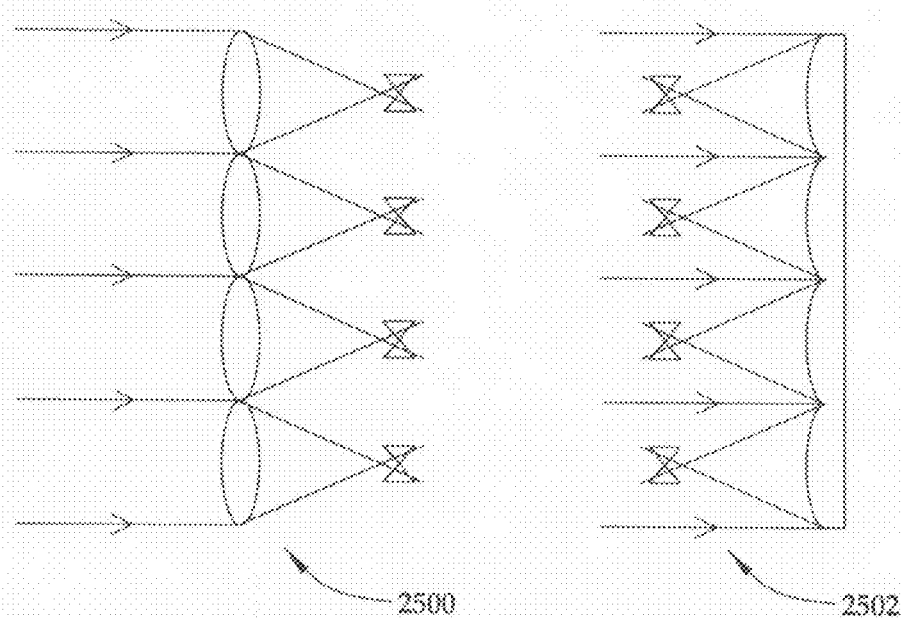
FIGS. 25A and 25B stylistically illustrate embodiments of two screens that may be employed with an LPD.

In some applications, it may be useful to use various specially designed screens. For example, the light diffused by a LPD screen can be directed into narrower than 180 deg. angle with a specially designed screen. A screen can have diffraction or holographic pattern, which insures that light is reflected (front projection) or diffused (rear projection) into a controllable angle (FIG. 24). Alternatively, a screen can consist of an array of refractive lenses 2500 (FIG. 25A) for rear projection, or mirrors 2502 (FIG. 25B) for front projection, which direct the light into a relatively narrow angle.

As shown in FIG. 26, lenses can be combined with prisms to form a structure 2600 that directs the light from all points of the screen into the same direction, independent of the direction the light is coming from. That allows uniform viewing angle to be achieved for an LPD with wide scan angle. A similar idea can also be implemented with mirrors for front projection screen or with diffractive screen.

Typically, Phase-Locked Loop circuits consist of a Voltage-Controlled Oscillator (VCO) 2700, a divider 2702, a phase detector 2704 and an amplifier 2706, and they operate to lock the frequency and phase of the VCO output signal to an external reference signal (FIG. 27A). If a signal with frequency already locked to the frequency of the external reference signal is already present, its phase can be locked by replacing VCO with Voltage-Controlled Delay circuit 2708 (FIG. 27B).

Figure 28A:
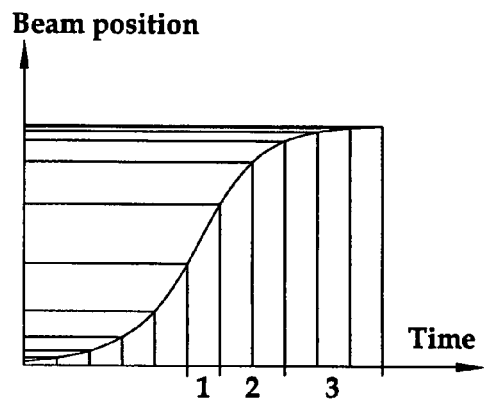
FIGS. 28A and 28B stylistically illustrate a graph of beam position versus time and a Look-up table to correct for non-linear aspects of the graph.
Figure 28B:
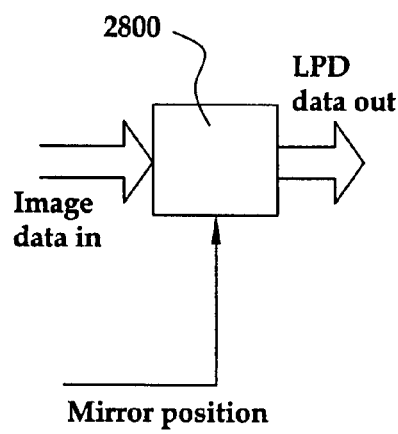

If a resonant mirror is used in the LPD, its scan profile could be other than linear, and in some cases may be sinusoidal. Hence, the beam will move a different distance per every clock tick, as is diagrammatically illustrated in FIG. 28A. To compensate for the nonlinear nature of the mirror movement, a look-up table 2800 (FIG. 28B), which assigns data of one pixel of source image to several clock ticks of LPD output data, depending on current mirror position, can be used.

Since the amount of light delivered by the laser beam to a particular point on the screen is inversely proportional to the speed with which the beam is moving, the power of the laser should also be decreased proportionally. This function may also be accomplished by a look-up table arrangement similar to that shown in FIG. 28B.

Figure 29A:
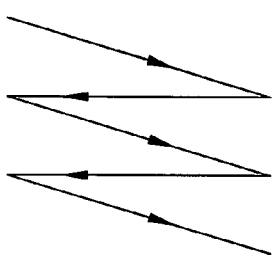
FIGS. 29A through 29C stylistically illustrate beam tracking patterns and a buffer arrangement used to correct for reverse tracking.
Figure 29B:
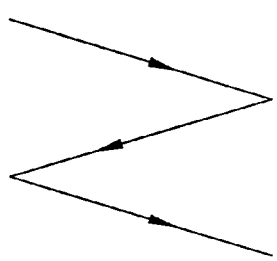
Figure 29C:
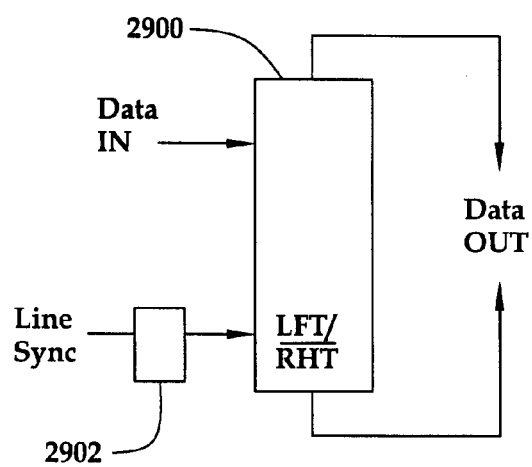

FIG. 29A stylistically illustrates a typically electron beam scan path in a conventional CRT. Generally, the electron beam is slowly moved in one direction across the viewing screen and then quickly returned backward. Ordinarily, data is clocked in only on the forward traverse. In the LPD of the instant invention, however, the LPD scans with the same speed in both directions, as depicted by the stylistic representation of the laser beam path shown in FIG. 29B. Hence, data is supplied during both forward and backward scans, but every second line of data has to be reversed since the scan occurs in the reverse direction. This reversing of data is accomplished in one embodiment of the instant invention with a bi-directional shift buffer 2900, as shown in FIG. 29C. Image data is loaded into the shift buffer 2900 in the same order as it is arranged in the source image. For example, left to right. A flip-flop 2902 triggers on every line and thus changes the shift direction of the buffer 2900, thereby accommodating the reversal of data on the reverse scan.

Figure 30:
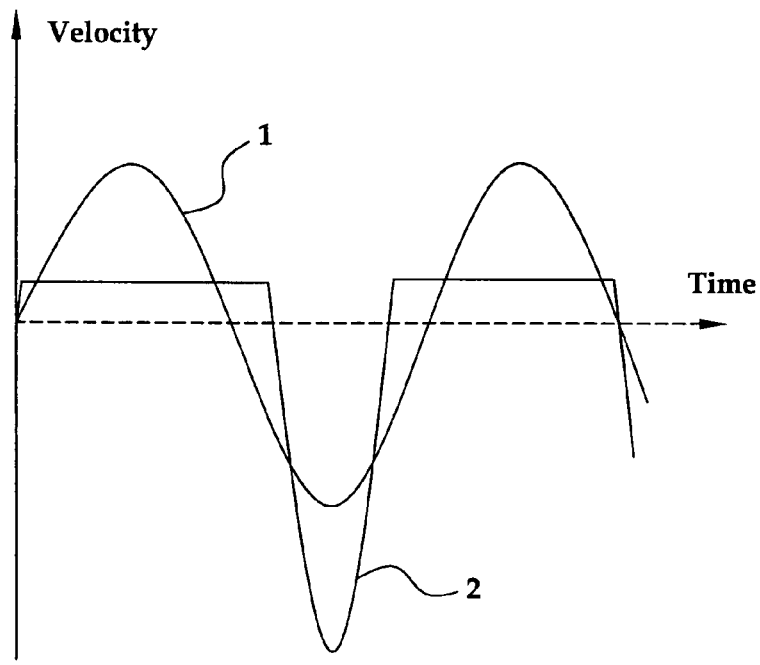
FIG. 30 stylistically illustrates mirror velocity as function of time.

In some embodiments of the instant invention, it may be useful to force the scanning mirror to move with constant speed in one direction, while jumping backward with its own resonant speed (FIG. 30, curve 2), if drive current is adjusted by a closed-loop control. Curve 1 of FIG. 30 shows a normal sinusoidal scan profile for reference.

Figure 31A:
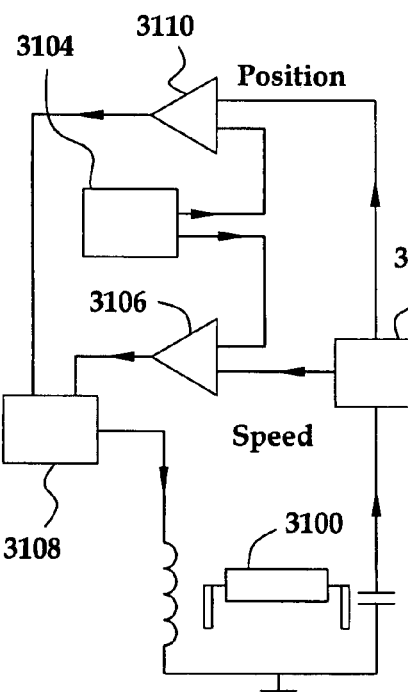
FIGS. 31A and 31B illustrate alternative embodiments of a system for closed loop control of mirror speed and position.

In the embodiment illustrated in FIG. 31, a mirror 3100 has built-in feedback unit 3102, which is capable of extracting both speed and position information of the mirror 3100. Such feedback may be piezoelectric or other, as described above. At the beginning of each constant speed cycle, a mirror controller 3104 sets a desirable speed, which is compared with speed feedback by an error amplifier 3106. An output terminal of the error amplifier 3106 is connected to a mirror driver 3108, so the output current of the driver 3108 is continuously adjusted to minimize the deviation of mirror speed from the value set by controller 3104. The controller 3104 also sets an end mirror position, which is compared with speed feedback by a comparator 3110. As soon as the mirror 3100 reaches its end position, the comparator 3110 switches the output signal of the driver 3108 into high-impedance state, so the mirror 3100 swings back under the torque of its hinge. Upon reaching the opposite end point, the comparator 3110 switches the driver 3108 back on, and a new cycle begins.

Figure 31B:
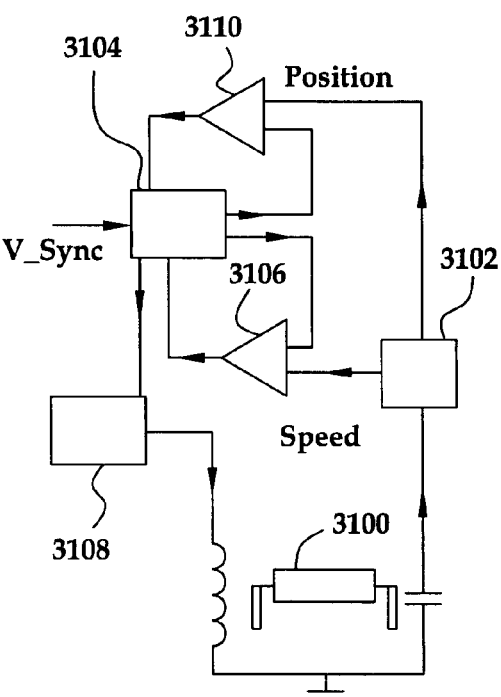
Figure 32:
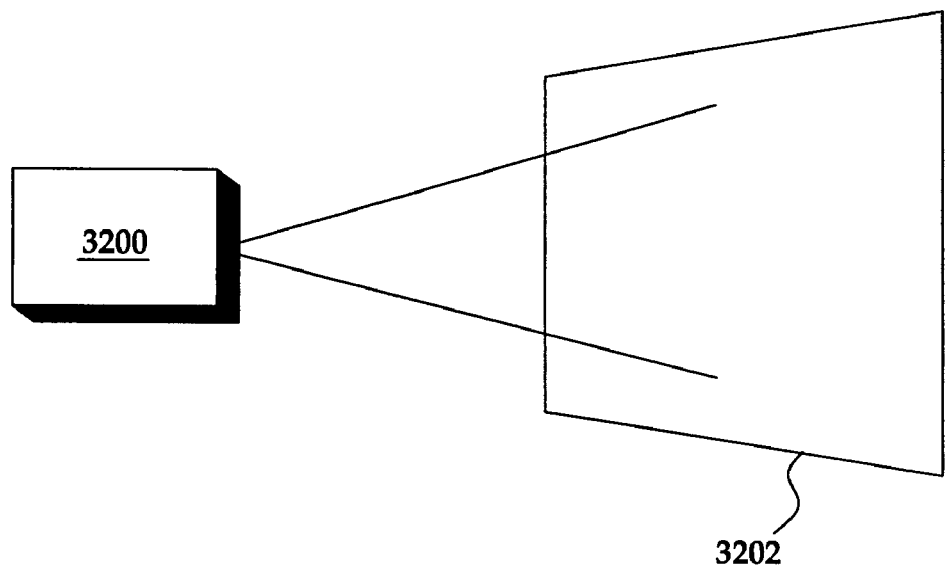
FIG. 32 illustrates a stylized representation of a laser projection device with a specialized screen capable of upconverting and/or downconverting laser light of a preselected frequency to light of a different frequency.

Alternatively, as shown in FIG. 31B, the driver 3108 may be under full control of the controller 3104, which is processing the feedback signal and adjusting driver 3108 accordingly. In this case, instead of continuously adjusting the driver 3108, the controller 3104 can repeat a pre-defined cycle, while making small changes from cycle to cycle. Optionally, the controller 3104 may be synchronized with Vertical Sync pulses from a host controller.

Turning now to FIGS. 32 through 36, various embodiments of the instant invention that may be useful to improve viewability of the laser projection display are shown. For example, in the embodiment shown in FIG. 32, an LPD 3200 is positioned to project laser light onto a specially constructed screen 3202 designed to interact with a particular wavelength of laser light emitted by the LPD 3200. In one embodiment of the instant invention, the LPD 3200 may be constructed using three lasers that emit green light, infra-red light and ultraviolet light, respectively. To obtain the traditional red, blue and green light commonly used to construct multi-color displays, the screen 3202 is constructed with materials that convert the infra-red light to red light (an up conversion) and the ultraviolet light to blue light (a down conversion).

One type of material that may be employed in the construction of the screen 3202 is known photoluminescent materials. For example, the screen 3202 may be at least partially treated or coated with phosphors that react by glowing or emitting light of a first preselected wavelength when illuminated by light having a second preselected wavelength. Thus, those skilled in the art will appreciate that the infra-red laser in the LPD 3200 may be controlled t illuminate those portions of the screen that are intended to have a component of red light. The phosphors located on the screen 3202 in the regions being illuminated with the infra-red light will respond to the infra-red light by glowing and emitting red light. Similarly, the phosphors located on the screen 3202 in the regions being illuminated with the ultraviolet light will respond to the ultraviolet light by glowing and emitting blue light. Thus, a person viewing the screen 3202 will perceive the desired mixture of red, blue and green light at various locations on the screen to produce an aesthetically pleasing multi-color display.

In an alternative embodiment of the instant invention, the LPD 3200 may be constructed using three lasers that emit green light, red light and light in the range of 370-405 nm, respectively. Laser light in the range of 370-405 nm is unique in that it tends to photoluminesce blue when projected onto a conventional white screen constructed of paper, for example. Thus, in this alternative embodiment, a simplifed screen 3202 may be employed while still providing a conventional multi-color display since the red and green laser light will be reflected by the white paper screen and the 370-405 nm light will photoluminesce blue.

Those skilled in the art will appreciate that aspects of these two embodiments may be combined to produce a variety of intermediate embodiments. For example, an LPD 3200 may be constructed using three lasers that emit green light, infra-red light and light in the range of 370-405 nm, respectively. The screen 3202 may then be constructed, at least in part, of a conventional white material such as paper to cause the 370-405 nm light to photoluminesce blue. Further, the screen 3202 may be at least partially coated with a phosphor that emits red light when illuminated by the infra-red laser light.

Further, those skilled in the art will appreciate that systems having reduced multi-color capabilities may be produced by using a two-laser system that produces only combinations of red and blue light, blue and green light, or red and green light.

In some applications it may be useful to use phosphor materials that exhibit substantial persistence, such as is commonly known as glow in the dark. Once illuminated, these materials are known to glow for a relatively long period of time even after the illumination has been removed. The persistence of these materials may be useful in producing screens that are useful for signage or even higher resolution screens. The persistence of the materials generally means that they do not need to be illuminated as often, which allows for a slower refresh rate without any noticeable "flashing." The slower refresh rate generally means that the LPD can be programmed to have a greater number of scan lines more closely packed together. Those skilled in the art will readily appreciate that more scan lines translates into higher resolution.

Figure 33A:
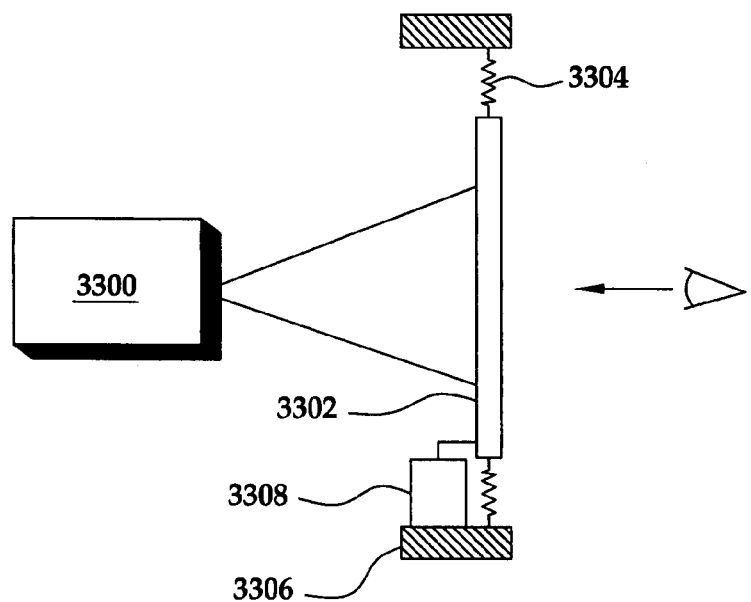
FIGS. 33A and 33B illustrate stylized representations of screen constructions configured to reduce laser speckling.
Figure 33B:
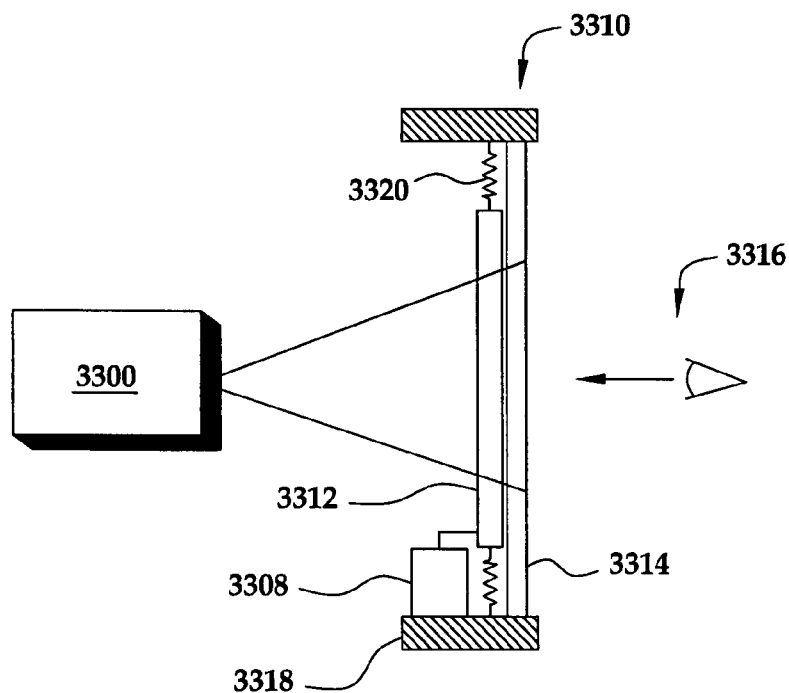

Turning now to FIGS. 33A and 33B, an LPD 3300 is illustrated illuminating a screen 3302 that is arranged to reduce laser speckling. It has been observed that very slight movements or oscillations of the screen 3302 tend to cancel or at least reduce laser speckling. Accordingly, in a first embodiment of the instant invention illustrated in FIG. 33A, the screen 3302 is coupled to a frame 3306 for limited movement. The limited movement is provided by a "loose" coupling that may be accomplished, for example, by a plurality of springs 3304 extending between the frame 3306 and the screen 3302. An actuator 3308, such as a linear actuator, is also coupled to the screen 3302 such that when the actuator is excited by a time varying signal it vibrates or moves the screen 3202. The vibrations induced in the screen 3202 are small, and may not be readily apparent to a person viewing the screen 3302.

In an alternative embodiment illustrated in FIG. 33B, a two-layer screen 3310 is illustrated. In this embodiment, the screen 3310 is comprised of a lens 3312, such as a fresnel lens, that receives laser light from the LPD 3300 and focuses the laser light onto a back lit screen 3314. An image is formed on the screen 3314 and viewed by a person from a position 3316 located in front of the screen 3314. In this embodiment of the instant invention, speckling may be reduced or even substantially eliminated by moving or vibrating the lens 3312. In this manner, the screen 3314 remains substantially stationary while the lens 3312 is vibrated very slightly. A frame 3318 is fixedly coupled to the screen 3314 and movably coupled to the lens 3312. In one embodiment of the instant invention, the movable connection may be accomplished by one or more springs 3320 extending between the frame 3318 and the lens 3312. Like the embodiment illustrated in FIG. 33A, the actuator 3308 is coupled to the lens 3312 such that when the actuator 3308 is excited by a time varying signal it vibrates or moves the lens 3312.

Figure 34:
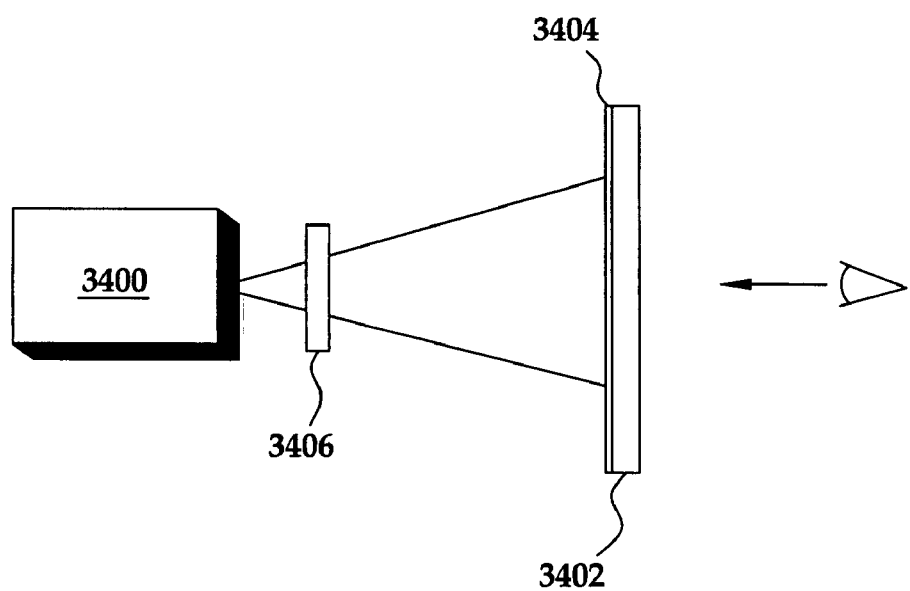
FIG. 34 illustrates a stylized representation of a laser projection device and screen configured to enhance contrast by polarization.

FIG. 34 stylistically illustrates an LPD system that employs polarization to enhance contrast. In the illustrated embodiment, an LPD 3400 is illustrated projecting laser light onto a rear surface of a screen 3402. A polarizing film 3404 has been located adjacent the rear surface of the screen 3402 such that laser light from the LPD 3400 passes through the polarizing film 3404 before being displayed on the screen 3402. The laser light emitted by the LPD 3400 is also polarized in a manner to match the orientation of the polarizing film 3404. Re-orienting the polarized laser light produced by the LPD 3400 may be accomplished, if necessary, using any of a variety of well-known techniques, such as by inserting a half wave plate 3406 in the optical path of the laser light. With the laser light polarized to match the orientation of the polarizing film 3404, substantially all of the incident laser light will pass through the polarizing film 3404 and be displayed on the screen 3402. Any ambient light or scattered laser light will, however, not be polarized to match the orientation of the polarizing film 3404, and thus, substantially half of this undesirable ambient or scatter light will be blocked by the polarizing film 3404. Thus, while the incident laser light is at substantially full power, interfering ambient or scattered light is substantially reduced, providing a substantially enhanced contrast.

Figure 35A:
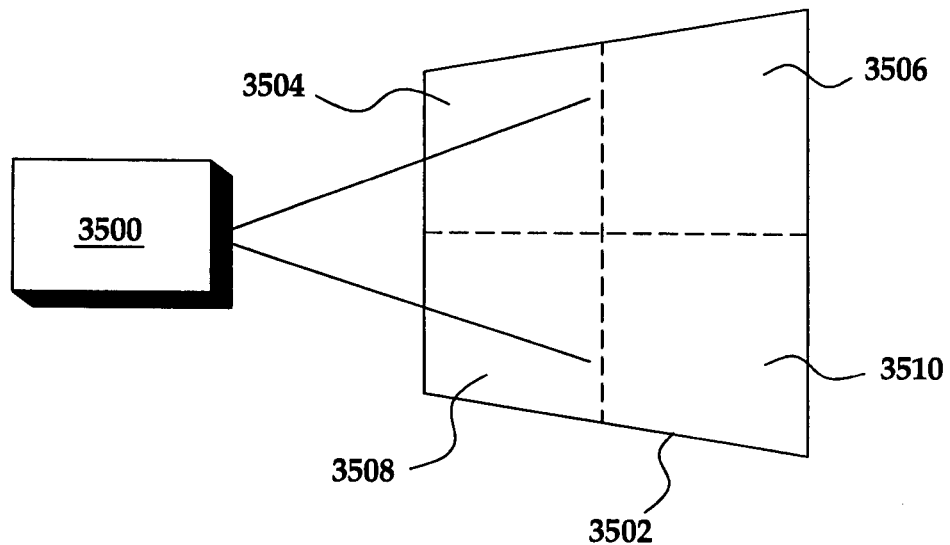
FIGS. 35A and 35B illustrate a stylized representation of a monochrome laser projection device with a screen with varying regions configured to photoluminesce at different frequencies when illuminated by the monochrome laser projection device.

Turning now to FIG. 35A, a single laser or monochrome laser LPD 3500 is illustrated providing a limited multi-colored display. A screen 3502 has been treated with photoluminescent materials, such as phosphors, that glow or emit various color light when illuminated by a common source. That is, each of the phosphors glows with its own distinct color in response to being illuminated by the same monochrome laser light. The screen 3502 may be constructed having a first region 3504 that has been coated or treated with a phosphor that glows blue when illuminated by the monochrome laser light. Similarly, the screen 3502 may be constructed having a second region 3506 that has been coated or treated with a phosphor that glows red when illuminated by the monochrome laser light. Regions 3508, 3510 may be similarly constructed to glow green and yellow, respectively.

Figure 35B:
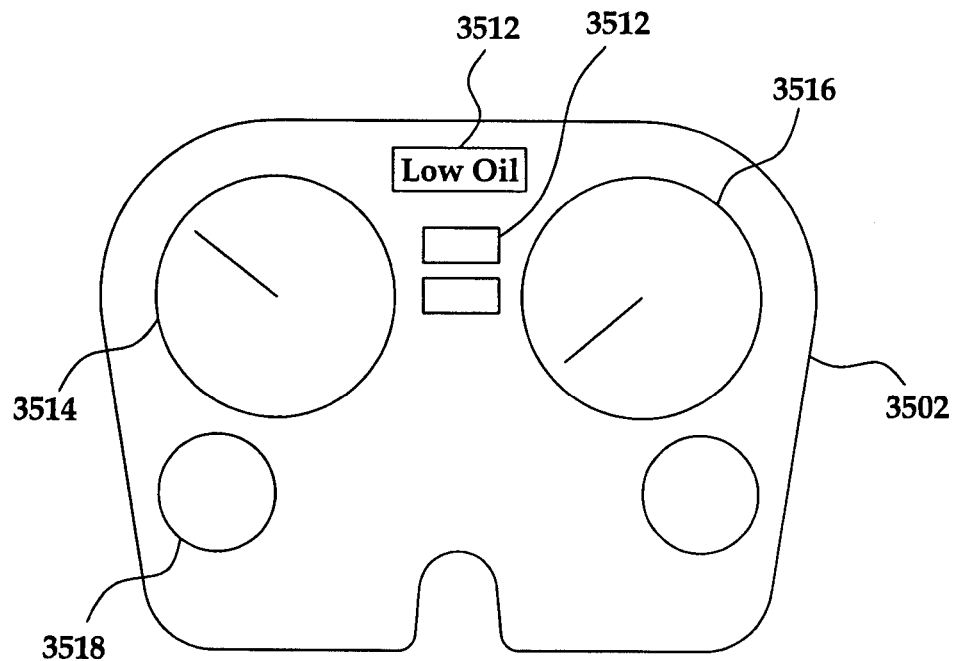

FIG. 35B illustrates one embodiment of the screen 3502 that may be useful in an automotive application. Various gauges, warning lamps, entertainment items and the like may be constructed or painted onto the screen 3502 using various phosphors. For example, warning lamps 3512 may be constructed on the screen 3502 using a phosphor that glows red when illuminated, whereas gauges, such as speedometers 3514 and tachometers 3516, fuel gauges 3518 and the like may be constructed using a phosphor that glows blue or green. Thus, when the monochrome laser LPD 3500 is controlled to illuminate the various portions of the screen 3502, the phosphors will glow in the appropriate color and provide useful information to the operator of the automobile, with the color being indicative of the type of information and/or its urgency.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system's memories or registers or other such information storage, transmission or display devices.

Those skilled in the art will appreciate that the various system layers, routines, or modules illustrated in the various embodiments herein may be executable control units. The control units may include a microprocessor, a microcontroller, a digital signal processor, a processor card (including one or more microprocessors or controllers), or other control or computing devices. The storage devices referred to in this discussion may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions when executed by the control units cause the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. Consequently, processing circuitry required to implement and use the described system may be implemented in application specific integrated circuits, software-driven processing circuitry, firmware, programmable logic devices, hardware, discrete components or arrangements of the above components as would be understood by one of ordinary skill in the art with the benefit of this disclosure. It is therefore evident that the particular embodiments disclosed above may be altered or modified and all such variations are considered within the scope and spirit of the invention. Accordingly, the protection sought herein is as set forth in the claims below.

We claim:

1. An arrangement for projecting an image, comprising:
   a) an energizable laser source for generating a laser beam;
   b) a scanner for sweeping the laser beam to form a scan line having pixels arranged along a first direction, and for sweeping the scan line along a second direction orthogonal to the first direction to form a raster pattern of scan lines;
   c) a controller for energizing the laser source to illuminate selected pixels on the scan lines to form the image to be projected;
   d) a projection screen on which the image is projected; and
   e) means for enhancing the image on the screen for improved viewability.

2. The arrangement of claim 1, wherein the laser beam has a wavelength, and wherein the enhancing means includes at least one phosphor at the screen for reflecting light with a wavelength different from the wavelength of the laser beam.

3. The arrangement of claim 2, wherein the wavelength of the laser beam is in an infrared range, and wherein the wavelength of the light reflected by the at least one phosphor is in a red range.

4. The arrangement of claim 2, wherein the wavelength of the laser beam is in an ultraviolet range, and wherein the wavelength of the light reflected by the at least one phosphor is in a blue range.

5. The arrangement of claim 2, wherein the enhancing means includes another phosphor at the screen for reflecting light with a wavelength different from the wavelength of the laser beam and from the wavelength of the light reflected by the at least one phosphor.

6. The arrangement of claim 1, wherein the laser source includes a plurality of lasers for respectively emitting constituent beams of different wavelengths, the constituent beams being combined to form the laser beam, and wherein the enhancing means includes a plurality of phosphors at the screen for reflecting light from each of the constituent beams with respective wavelengths different from the wavelengths of the constituent beams.

7. The arrangement of claim 1, wherein the laser beam has a wavelength in a range from 370 to 405 nm, and wherein the screen is constituted of a white paper.

8. The arrangement of claim 1, wherein the enhancing means includes a plurality of phosphors at designated areas of the screen, each phosphor being operative for reflecting light with a different color upon being illuminated by the laser beam.

9. The arrangement of claim 2, wherein the at least one phosphor exhibits substantial persistence and luminesces for a time after the controller is not energizing the laser source.

10. The arrangement of claim 1, wherein the projection screen is mounted for movement, and wherein the enhancing means includes a drive for moving the projection screen to reduce speckle noise.

11. The arrangement of claim 1, and a lens through which the image is projected onto the projection screen, and wherein the lens is mounted for movement, and wherein the enhancing means includes a drive for moving the lens to reduce speckle noise.

12. The arrangement of claim 1, wherein the laser beam has a polarization, and wherein the enhancing means includes a polarizer at the screen and having a polarization matching the polarization of the laser beam to enhance image contrast.

13. A method of projecting an image, comprising the steps of:
   a) generating a laser beam;
   b) sweeping the laser beam to form a scan line having pixels arranged along a first direction, and sweeping the scan line along a second direction orthogonal to the first direction to form a raster pattern of scan lines;
   c) illuminating selected pixels on the scan lines to form the image to be projected;
   d) projecting the image on a projection screen; and
   e) enhancing the image on the screen for improved viewability.

14. The method of claim 13, wherein the generating step generates the laser beam with a wavelength, and wherein the enhancing step provides at least one phosphor at the screen for reflecting light with a wavelength different from the wavelength of the laser beam.

15. The method of claim 14, wherein the wavelength of the laser beam is in an infrared range, and wherein the wavelength of the light reflected by the at least one phosphor is in a red range.

16. The method of claim 14, wherein the wavelength of the laser beam is in an ultraviolet range, and wherein the wavelength of the light reflected by the at least one phosphor is in a blue range.

17. The method of claim 14, wherein the enhancing step includes providing another phosphor at the screen for reflecting light with a wavelength different from the wavelength of the laser beam and from the wavelength of the light reflected by the at least one phosphor.

18. The method of claim 13, wherein the generating step generates a plurality of constituent beams of different wavelengths, the constituent beams being combined to form the laser beam, and wherein the enhancing step includes providing a plurality of phosphors at the screen for reflecting light from each of the constituent beams with respective wavelengths different from the wavelengths of the constituent beams.

19. The method of claim 13, wherein the enhancing step includes providing a plurality of phosphors at designated areas of the screen, each phosphor being operative for reflecting light with a different color upon being illuminated by the laser beam.

20. The method of claim 14, wherein the at least one phosphor exhibits substantial persistence.

21. The method of claim 13, and mounting the projection screen for movement, and wherein the enhancing step includes moving the projection screen to reduce speckle noise.

22. The method of claim 13, and mounting for movement a lens through which the image is projected onto the projection screen, and wherein the enhancing step includes moving the lens to reduce speckle noise.

23. The method of claim 13, wherein the laser beam has a polarization, and wherein the enhancing step includes providing a polarizer at the screen and having a polarization matching the polarization of the laser beam to enhance image contrast.

* * * * *